United States Patent [19]
Uchida et al.

[11] Patent Number: 5,694,019
[45] Date of Patent: Dec. 2, 1997

[54] BATTERY CHARGING APPARATUS AND NETWORK SYSTEM WITH ENHANCED VERSATILITY IN DISPENSING RECHARGED BATTERIES

[75] Inventors: Shirou Uchida, Isehara; Yasutaka Gotoh, Tokyo, both of Japan

[73] Assignee: Ricoh Company, Ltd., Tokyo, Japan

[21] Appl. No.: 722,942

[22] Filed: Sep. 30, 1996

[30] Foreign Application Priority Data

Sep. 29, 1995 [JP] Japan .................................. 7-276566
Jun. 3, 1996 [JP] Japan .................................. 8-140508

[51] Int. Cl.$^6$ ................................................ H01M 10/46
[52] U.S. Cl. ................................ 320/6; 320/15; 320/30
[58] Field of Search ........................... 320/2, 6, 15, 19, 320/22, 27, 30, 31, 39, 48

[56] References Cited

U.S. PATENT DOCUMENTS

| | | |
|---|---|---|
| 4,571,533 | 2/1986 | Dey ............................................. 320/25 |
| 4,577,144 | 3/1986 | Hodgman et al. ........................... 320/2 |
| 5,206,577 | 4/1993 | Fish ............................................ 320/2 |
| 5,237,257 | 8/1993 | Johnson et al. ............................. 320/2 |
| 5,291,118 | 3/1994 | Kojima ................................... 320/37 X |
| 5,549,443 | 8/1996 | Hammerslag ........................... 320/2 X |

*Primary Examiner*—Edward Tso
*Attorney, Agent, or Firm*—Oblon, Spivak, McClelland, Maier & Neustadt, P.C.

[57] ABSTRACT

A battery charging apparatus, which can be part of a battery charging network, operates to detect insertion of a battery, and to read information on the inserted battery. The inserted battery can be charged, although a charged battery is immediately output from a battery charging apparatus upon the insertion of the battery to be charged. Further, the charging and outputting operations can be controlled based on the read information. Such a system of the present invention can find application in the charging of all batteries, including batteries for electrical automobiles.

40 Claims, 21 Drawing Sheets

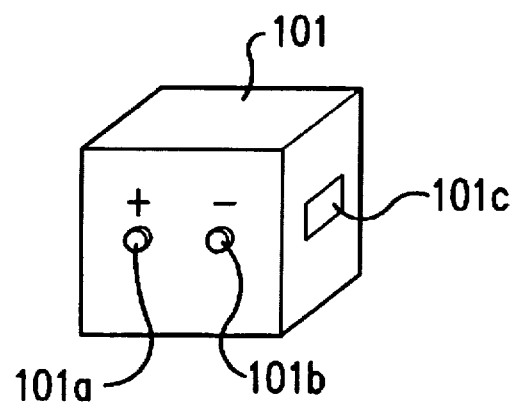
FIG. 25
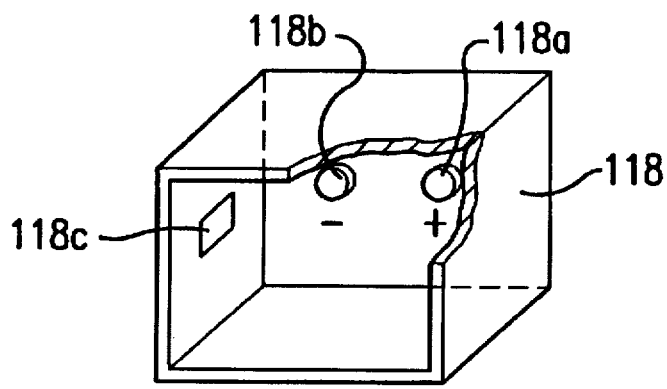
FIG. 26
| ① | CHARGING NOW |
| --- | --- |
| ② | FINISH CHARGE |
| ③ | FINISH CHARGE |
| ④ | VACANT |
FIG. 27

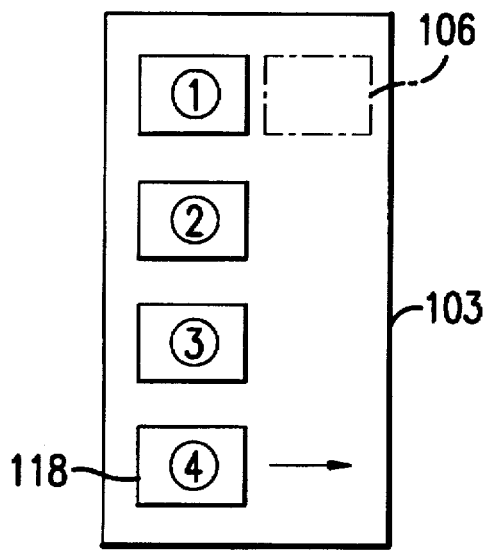
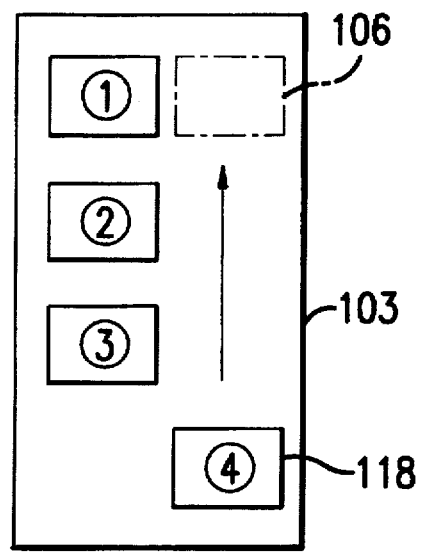
FIG.28(a)   FIG.28(b)
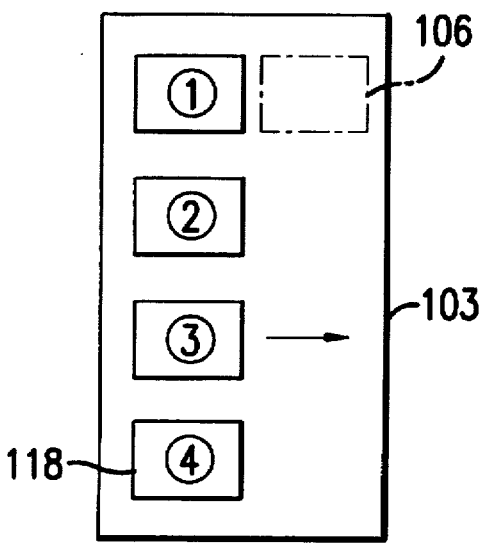
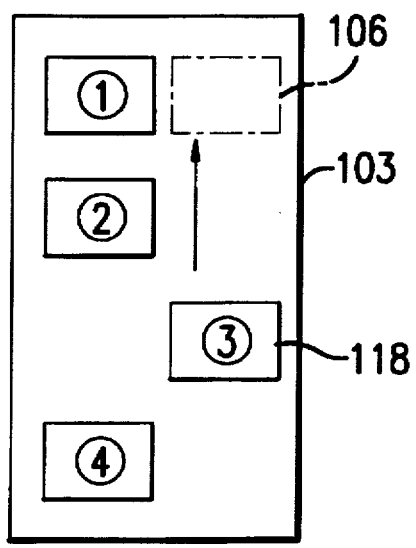
FIG.29(a)   FIG.29(b)

BATTERY CHARGING APPARATUS AND NETWORK SYSTEM WITH ENHANCED VERSATILITY IN DISPENSING RECHARGED BATTERIES

BACKGROUND OF THE INVENTION

1. Field of the Invention

The present invention relates to a battery charging apparatus and a network system for improving convenience of a rechargeable battery.

2. Discussion of Background

Household electric appliances, portable data communication equipment, watches, cameras, and electric calculators are typically powered by various types of batteries such as a manganese battery, an alkali battery, a lithium battery, a Ni—Cd battery, etc. However, these batteries have a finite life, and when the finite life is reached, these batteries must be disposed.

In addition, recently national and local governments have strongly advocated the protection of the global environment. As a result, the collection of various used batteries has become more and more active.

Further, local governments have legislated the recycling of batteries so that the collection and reuse of used batteries is being promoted. However, the collection and reuse of used batteries requires a large effort and cost, and as a result most used batteries are abandoned without collection or reuse.

To address this problem, the use of rechargeable batteries which may be charged over and over has been promoted; using such rechargeable batteries is thus advantageous for the protection of the global environment. Nevertheless, there are drawbacks that rechargeable batteries are costly, a rechargeable battery needs a charger for recharging, a long time is often required for recharging, etc. As a result, many users choose not to use rechargeable batteries in general.

On the other hand, recently an electric automobile has been made more practicable, and a popularization of this electric automobile is expected in the future. Nevertheless, a popularization of such an electric automobile cannot be expected if a battery of the electric automobile cannot be recharged easily and in a short time.

SUMMARY OF THE INVENTION

It is an object of the present invention to provide a novel battery charging apparatus and network system which overcomes these drawbacks.

It is a further object of the present invention to provide a novel battery charging apparatus and network system which is capable of obviating requiring a user to charge a used battery.

It is a further object of the present invention to provide a novel battery recharging apparatus and network system which allows a plurality of battery charging apparatuses to be utilized at a low cost, and which allows efficient monitoring of such a plurality of novel battery recharging apparatuses.

It is a further object of the present invention to provide a novel battery recharging apparatus and network system which allows a user to have easy and fast access to a recharged battery, and which can efficiently promote the use of battery storage and removal.

These and other objects of the present invention are achieved by forming a battery charging apparatus, which can be placed in a network, which includes detecting insertion of a battery, reading information on the inserted battery, charging the inserted battery and outputting a charged battery. Further, the present invention can control the charging and outputting operations based on the read information. Such battery charging apparatuses can also be connected to a network through a communication line.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIG. 25 is an elevation view of a battery which is used by the battery charging apparatus of the second embodiment of the present invention;

FIG. 26 is an elevation view of a battery box of the battery charging apparatus of the second embodiment of the present invention;

FIG. 27 is a management table of the battery charging apparatus of the second embodiment of the present invention;

FIG. 28 and FIG. 29 are sectional views of the battery charging apparatus of the second embodiment of the present invention;

DESCRIPTION OF THE PREFERRED EMBODIMENTS

Figure 1:
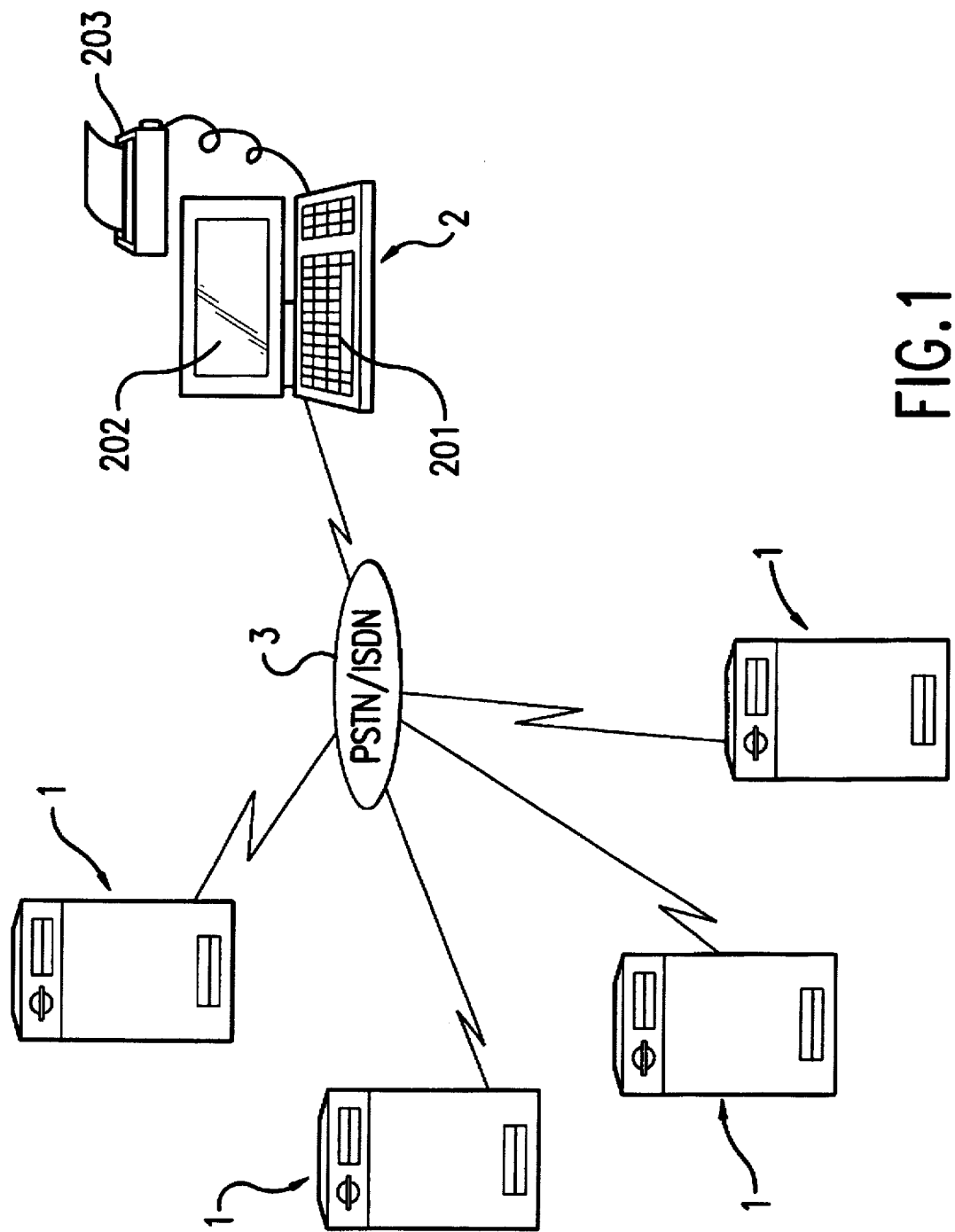
FIG. 1 is a system construction of a battery charging apparatus and network system of a first embodiment of the present invention.

Referring to FIG. 1 of the drawings, a first embodiment of a battery charging apparatus and network system in accordance with the present invention is shown.

In the present invention, a plurality of battery charging apparatus 1 are connected to a network management apparatus 2. A battery charging apparatus 1 may be placed at a location, station, store, e.g., where a user can easily make use of the battery charging apparatus 1. The network management apparatus 2, or host computer system and controller, includes an operation board 201, a display unit 202 and a printer unit 203, and is connected to the battery charging apparatus 1 by a communication network line 3, for example, a PSTN (Public Switched Telephone Network), an ISDN (Integrated Service Digital Network), a wireless telephone network, etc.

Figure 2:
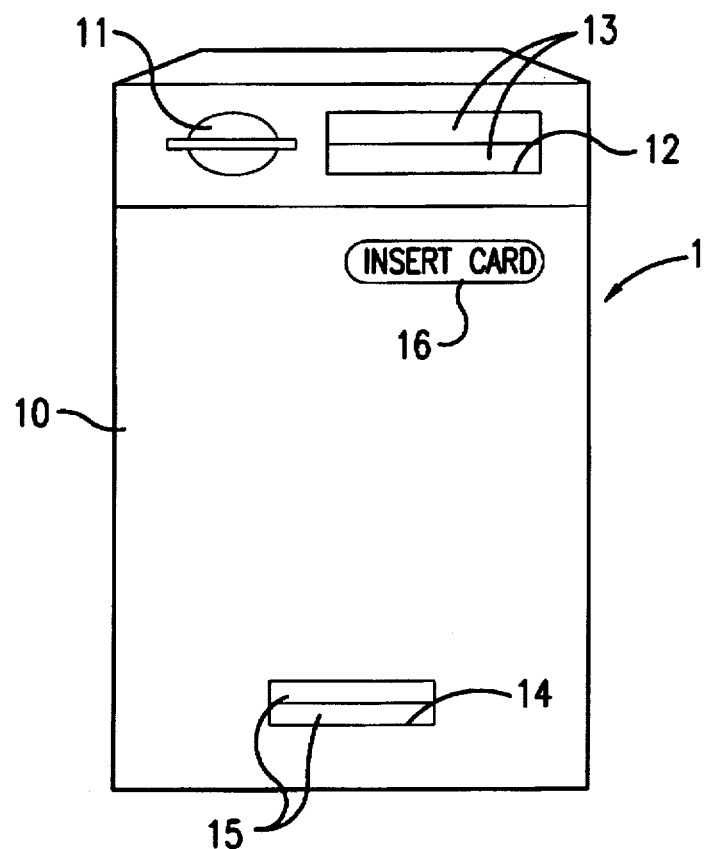
FIG. 2 is a front view illustrating the battery charging apparatus of the first embodiment of the present invention.

Referring to FIG. 2, a main body 10 of the battery charging apparatus 1 includes a card entrance port 11, a battery entrance port 12, shutters 13, 15 for respectively opening/closing the card entrance port 11 and a battery discharging port 14, and a display 16, such as a LCD (Liquid Crystal Display).

Figure 3:
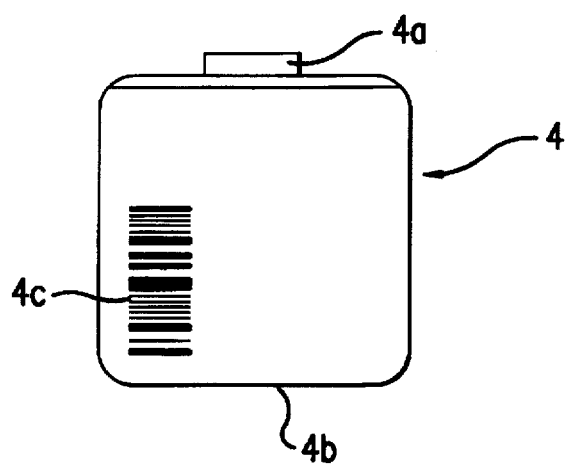
FIG. 3 is a side elevation view of a battery which is used by the battery charging apparatus of the first embodiment of the present invention.

Referring to FIG. 3, a battery 4 for use in this battery charging apparatus 1 has a bar code 4c (or an attached recording medium) printed thereon as a battery ID, and includes a pair of terminals 4a, 4b. By this structure, battery classification, such as the type of battery (e.g. manganese battery, alkali battery, lithium battery, Ni—Cd battery, etc.) a battery charging time, etc., may be recorded in the bar code as the battery ID 4c.

Figure 4:
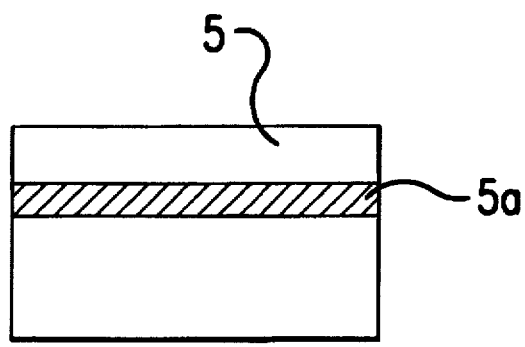
FIG. 4 is a side elevation view of a card which is used by the battery charging apparatus of the first embodiment of the present invention.

Referring to FIG. 4, a card 5 to be input to the card entrance part 11 for using the battery charging apparatus 1 is, as an example, formed of resin or plastic, like a credit card or prepaid card, and has a magnetic stripe 5a thereon which stores user information, such as a user ID. This card 5 may be provided when a user contracts with a company which offers service of the battery charging apparatus 1, and information (e.g. name, address, number of user's bank account) and rental battery ID information can be registered on the network management apparatus 2 of the company.

Figure 5:
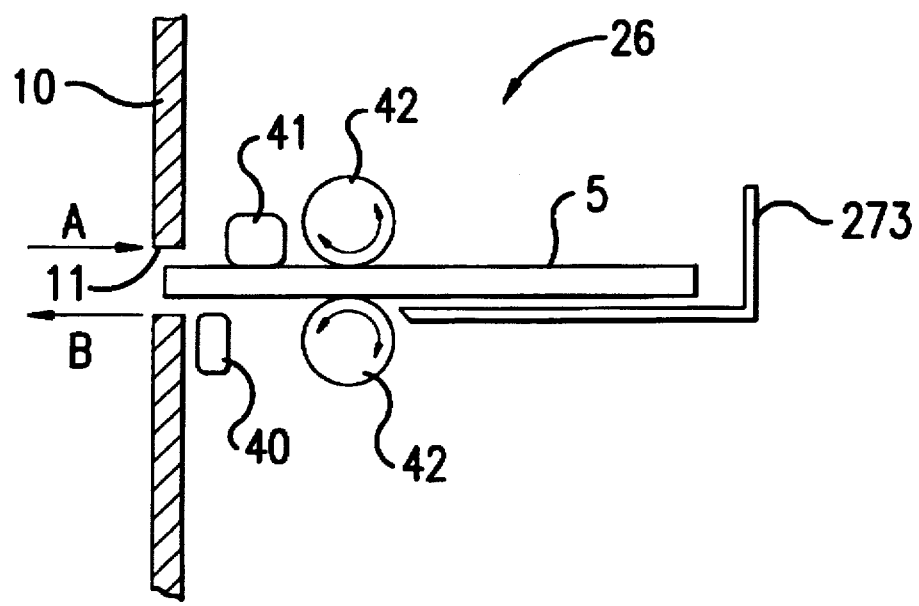
FIG. 5 is a sectional view of a card reading unit of the battery charging apparatus of the first embodiment of the present invention.

Referring to FIG. 5, a card access unit 26, which is formed inside of card entrance port 11, includes a photosensor 40 for detecting card 5 insertion, a magnetic head 41 for reading user information from magnetic stripe 5a, a pair of conveying rollers 42 for conveying the inserted card 5, and stopper 273 for stopping the inserted card 5 at a predetermined position. In accordance with this card access unit 26, when a user inserts the card 5 from the card entrance port 11 and the photosensor 40 detects the card insertion, a motor (not shown) starts to rotate the conveying rollers 42 clockwise and the conveying rollers 42 convey the inserted card 5 in a direction of arrow A. At this time the magnetic head 41 reads the user information from the magnetic stripe 5a. By the way, when the card 5 is returned to a user, the motor (not shown) rotates the conveying rollers 42 counter-clockwise and the card 5 is conveyed in a direction of arrow B for outputting card 5.

Figure 6:
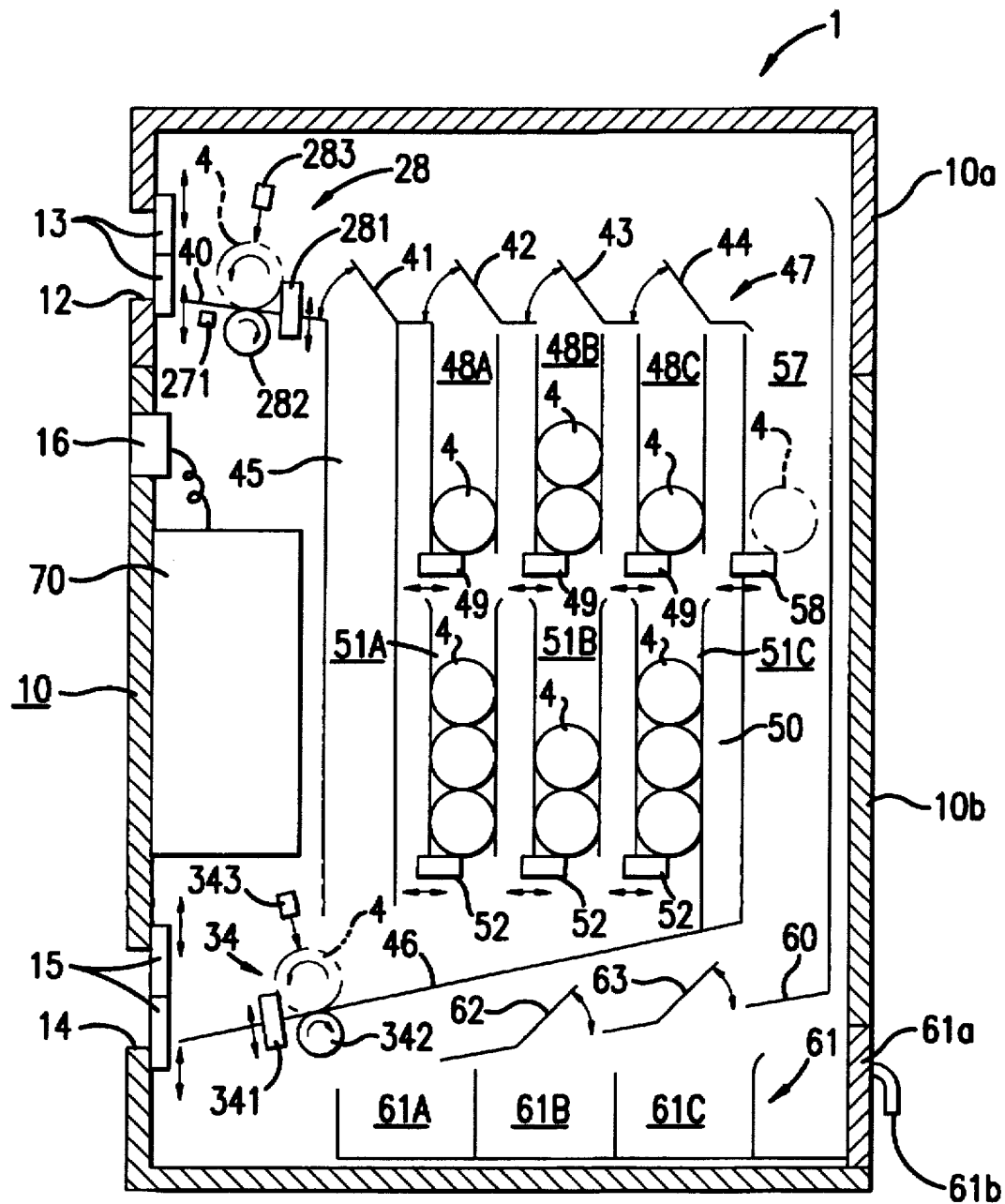
FIG. 6 is a sectional view of the battery charging apparatus of the first embodiment of the present invention.

Referring to FIG. 6, the main body 10 of the battery charging apparatus 1 includes upper body 10a and lower body 10b, which can be locked closed. The battery charging apparatus 1 includes a slope 40 for guiding a battery inserted through battery entrance port 12, a photosensor 271 of a battery detecting unit 28 for detecting battery insertion, a battery stopper 281, a rotation roller 282, a CCD (charged coupled device) sensor 283 for reading the bar code 4c on the inserted battery, doors 41, 42, 43, 44, 62, 63, a battery return guide 45, a slope 46 for guiding out a charged battery, a stopper 341, a rotation roller 342, and a CCD sensor 343 for reading the bar code 4c on the charged battery. Battery charging apparatus 1 further includes a first battery guide 48A and 51A for guiding, e.g., a manganese battery, a second battery guide 48B and 51B for guiding, e.g., an alkali battery, a third battery guide 48C and 51C for guiding, e.g., a Ni—Cd battery, stoppers 49, 52, 58 which may move in a direction of the arrows by a solenoid (not shown), a battery collection guide 57, a disposed battery stack 61 including a first battery stack 61a for stacking, e.g., a manganese battery to be disposed, a second battery stack 61B for stacking, e.g., an alkali battery to be disposed, a third battery stack 61C for stacking, e.g., a Ni—Cd battery to be disposed, and an electric device unit 70 which is connected to display part 16 by the communication line.

Figure 7:
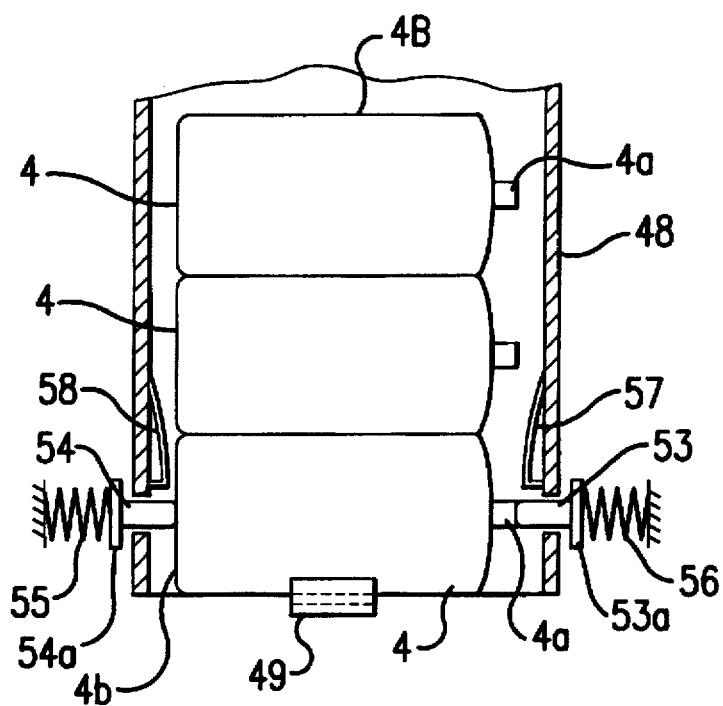
FIG. 7 is a sectional view of a battery guide of the battery charging apparatus of the first embodiment of the present invention.

Referring to FIG. 7, in accordance with the battery guides 48 (48A, 48B, 48C), the inserted battery is distributed appropriately based on the type of battery by doors 42, 43, 44, and then the inserted battery 4 falls down guided by the battery guide 48 and guide boards 57, 58. The inserted battery is stopped by the stopper 49 and the plus and minus terminals 4a, 4b of the battery contact a pair of pins 53, 54 which are pushed toward the plus and minus terminals 4a, 4b of the battery by springs 55, 56. Flanges 53a, 54a of the pins 53, 54 control a quantity that the pins 53, 54 stand out. It is also noted that if the battery 4 is discharged for a time before being charged, this may raise an efficiency of the battery charging. Therefore, the present invention may include battery collection guide 57 which executes such a discharging operation, as discussed in further detail below. After the battery 4 is charged, the stopper 49 moves (comes off), so that the charged battery falls down to the battery guides 51 (51A, 51B, 51C).

Figure 8:
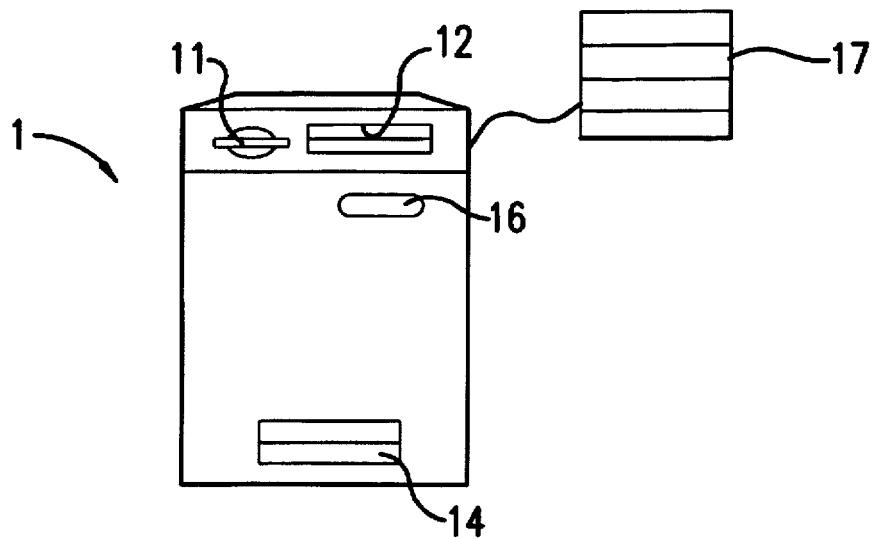
FIG. 8 is a front view illustrating an arrangement of the battery charging apparatus of the first embodiment of the present invention.

FIG. 8 is a representative construction of a battery charging apparatus 1 which further includes a solar panel 17 for supporting the power supply for charging the batteries.

Figure 9:
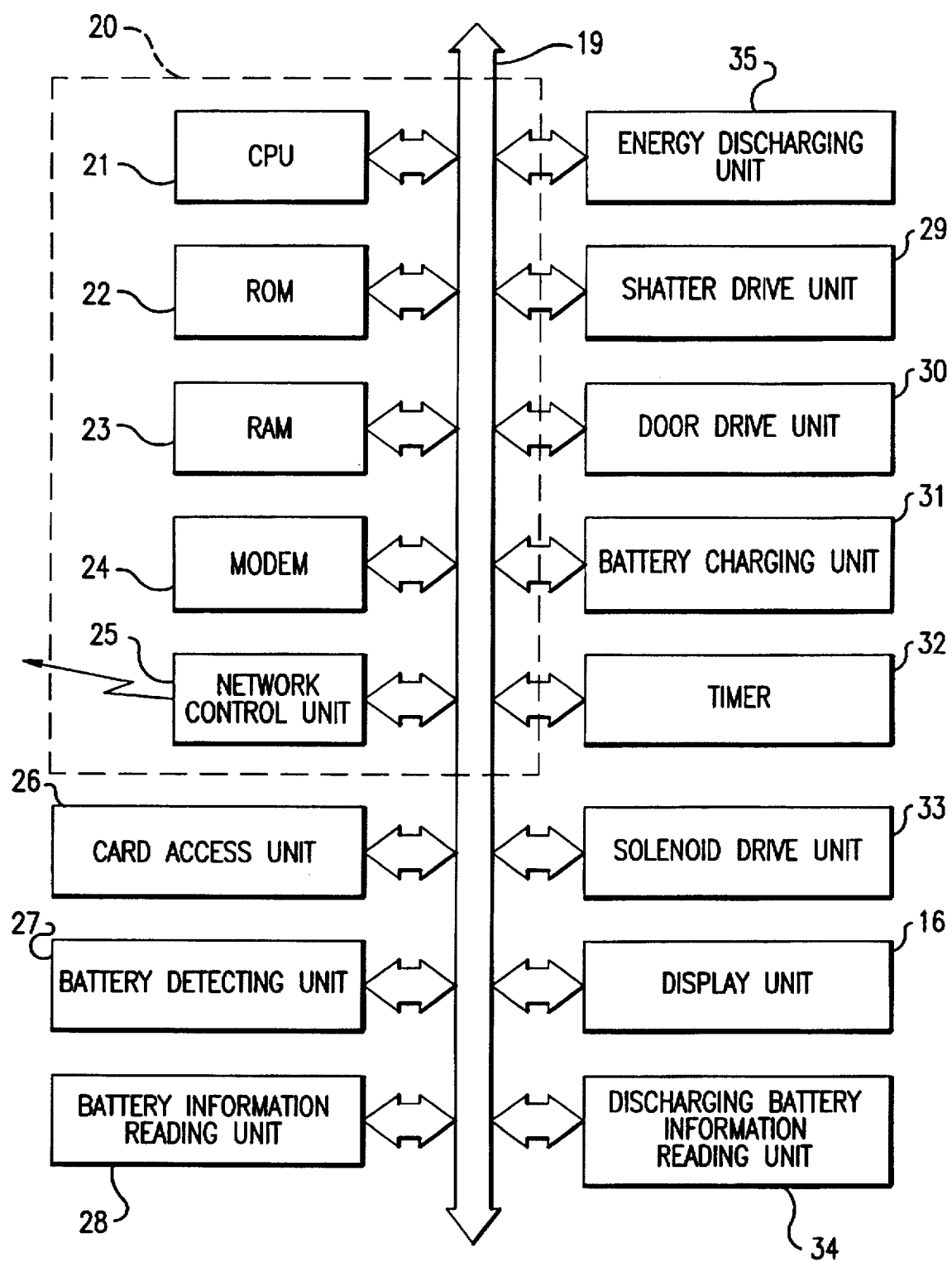
FIG. 9 is a schematic block diagram of the battery charging apparatus of the first embodiment of the present invention.

Referring to FIG. 9, the electric device unit 70 of FIG. 6 is shown in further detail. As shown in FIG. 7, such an electric device 7 includes a CPU (central processing unit) 21, a ROM (read only memory) 22, a RAM (random access memory) 23, a MODEM 24, a network control unit 25, a card access unit 26, a battery detecting unit 27, a battery information reading unit 28, an energy discharging unit 35, a shutter drive unit 29, a door drive unit 30, a battery charging unit 31, a timer 32 for counting a clock, a solenoid drive unit 33 for driving the stoppers 49, 52, a display unit 16, and an output battery information reading unit 34, all of which are coupled to each other by system bus 19. The CPU 21, the ROM 22, the RAM 23, the MODEM 24, and the network communication unit 25 form a controller 20.

The shutter drive unit 29 drives the shutters 13 and 15 by a solenoid (not shown) based on an indication of the CPU 21. The door drive unit 30 also drives the doors 41, 42, 43, 44, 62, 63 by a solenoid (not shown) based on indication of the CPU 21. The solenoid drive unit 33 drives a solenoid for moving the stoppers 49, 52, 58, 281, 341 also based on an indication of the CPU 21.

Figure 10:
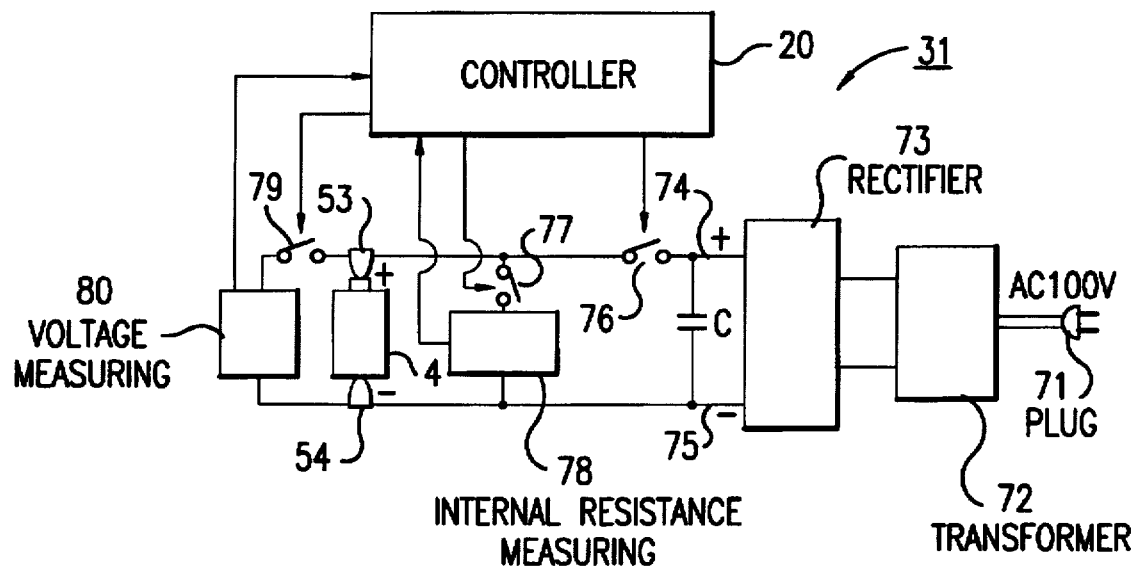
FIG. 10 is a schematic circuit diagram of a battery charging unit of the first embodiment of the present invention.

Referring to FIG. 10, the battery charging unit 31 receives as an input, as an example, an AC 100V by a plug 71 and changes the AC 100V to a predetermined direct current voltage by a transformer 72, a rectifier 73, and a condenser C. And then, the battery charging unit 31 outputs a predetermined direct current voltage to a pair of output lines 74, 75 connected with the electrode pins 53, 54. Switch devices 76, 77, 79 are included and are controlled by the controller 20, and an internal resistance measuring circuit 78 measures an internal resistance of the inserted battery 4 and outputs the measured resistance to the controller 20. Also, a voltage measuring circuit 80 measures a voltage of the inserted battery 4 and outputs the measured voltage to the controller 20.

Initially, the controller 20 only turns on the switch device 77, and then the internal resistance measuring circuit 78 measures an internal resistance of the inserted battery 4 and outputs the measured resistance to the controller 20 for recognizing whether the inserted battery 4 may be charged or not. If the internal resistance of the insert battery 4 is too low, this may indicate that the battery 4 can no longer be charged. When the inserted battery 4 can be charged, the controller 20 turns off the switch device 77 and turns on the switch device 79, and the voltage measuring circuit 80 measures a voltage of the inserted battery 4 and outputs the measured voltage to the controller 20 for calculating an appropriate payment fee. That is, in this operation of the present invention, a fee charged to a user may be based on the amount of charging needed for the battery 4 which the user has inserted into the battery charger apparatus 1.

Then, the controller 20 turns off the switch device 79 and turns on the switch device 76, and starts to charge the inserted battery 4. The controller 20 then turns off the switch device 76 and turns on the switch device 79, and the voltage measuring circuit 80 measures a voltage of the inserted battery 4 during charging and outputs the measured voltage to the controller 20 at a predetermined timing. When the measured voltage amount is equal to a predetermined voltage, the controller 20 recognizes that the inserted battery 4 is fully charged and finishes charging the inserted battery 4 by turning off the switch device 76. The controller 20 then moves the stopper 49, so that the charged battery falls down to the battery guide units 51 (51A, 51B, 51C), and the next inserted battery 4 is stopped by the stopper 49 and then the charging process is repeated for the next inserted battery 4. This action is repeated until there is no battery left in the battery guides 48A, 48B, 48C. As one feature, the plug 71, the transformer 73, the rectifier 73, and the condenser C can be shared by every battery guide 48.

Figure 11:
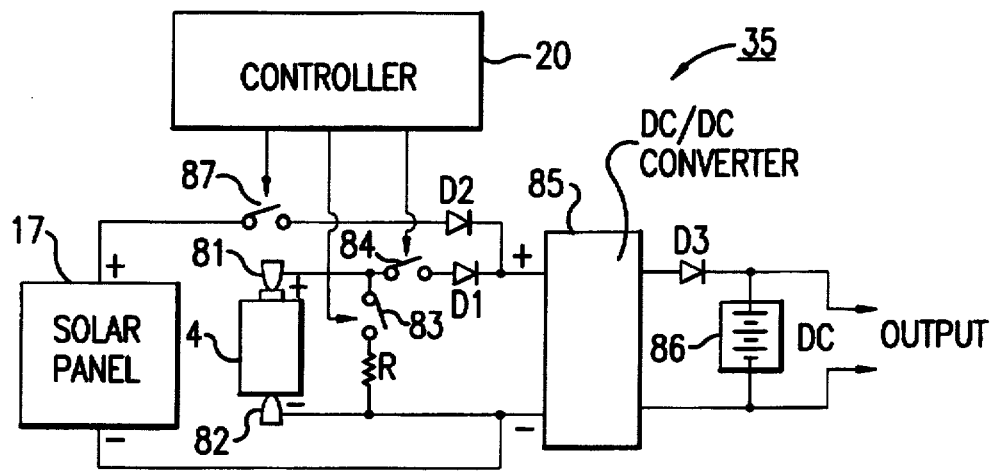
FIG. 11 is a schematic circuit diagram of an energy discharging unit of the first embodiment of the present invention.

Referring to FIG. 11, an energy discharging unit 35 on the battery collection unit 57 includes a pair of electrode pins 81, 82 like the electrode pins 53, 54, switch devices 83, 84, 87 which are controlled by the controller 20, a DC/DC converter 85, and a storage battery 86. This composition may also include the solar battery panel 17 as a power supply.

In this composition, when the controller 20 turns on the switch device 83 for discharging, the inserted battery 4 may have its remaining charge discharged. Then, when the controller 20 turns off the switch device 83 and turns on the switch device 84, a remaining electrical energy of the inserted battery 4 may be output to the storage battery 86 due to the DC/DC converter 85 for charging the storage battery 86. By the way, diodes D1, D2, D3 may also be provided for preventing a counter current.

Figures 12, 13:
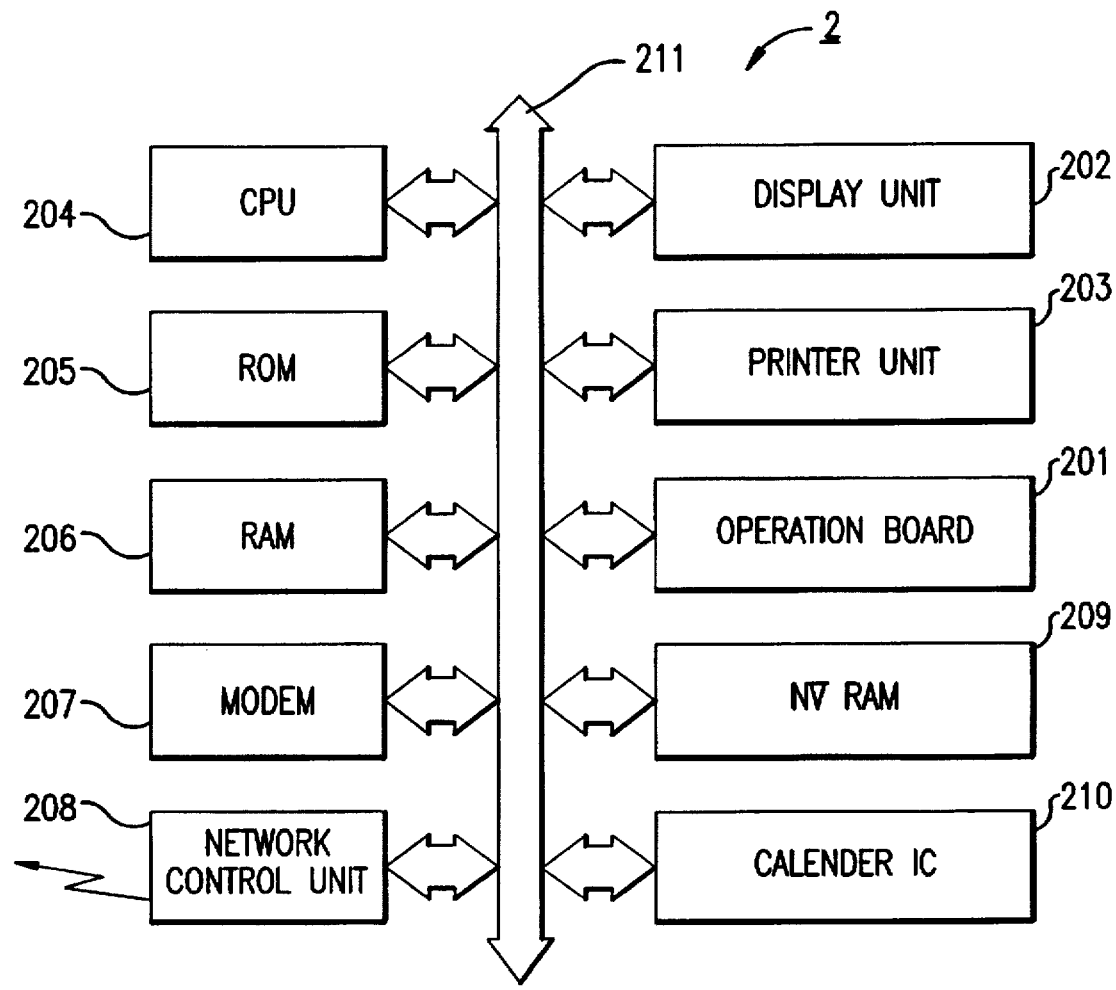
FIG. 12 is a schematic block diagram of a network management apparatus of the first embodiment of the present invention.
FIG. 13 is a schematic representation of a bill which is printed out by the network management apparatus of the first embodiment of the present invention.

Referring to FIG. 12, the network management apparatus 2 is shown and includes a CPU 204, a ROM 205, a RAM 206, a MODEM 207, a network communication unit 208, a display unit 202 such as a LCD (liquid crystal display), a printer unit 203, an operation board 201, a NV RAM (non-volatile random access memory) 209 such as a flash memory, and a calendar IC for recognizing the date/time, all of which are coupled to each other by system bus 211.

FIG. 13 shows an example of a bill which is printed by the printer unit 203 and sent to a user every month. As shown in FIG. 13, such a bill includes a user ID, an account ID (e.g. financial institution) and a listing of the transactions.

Figure 14:
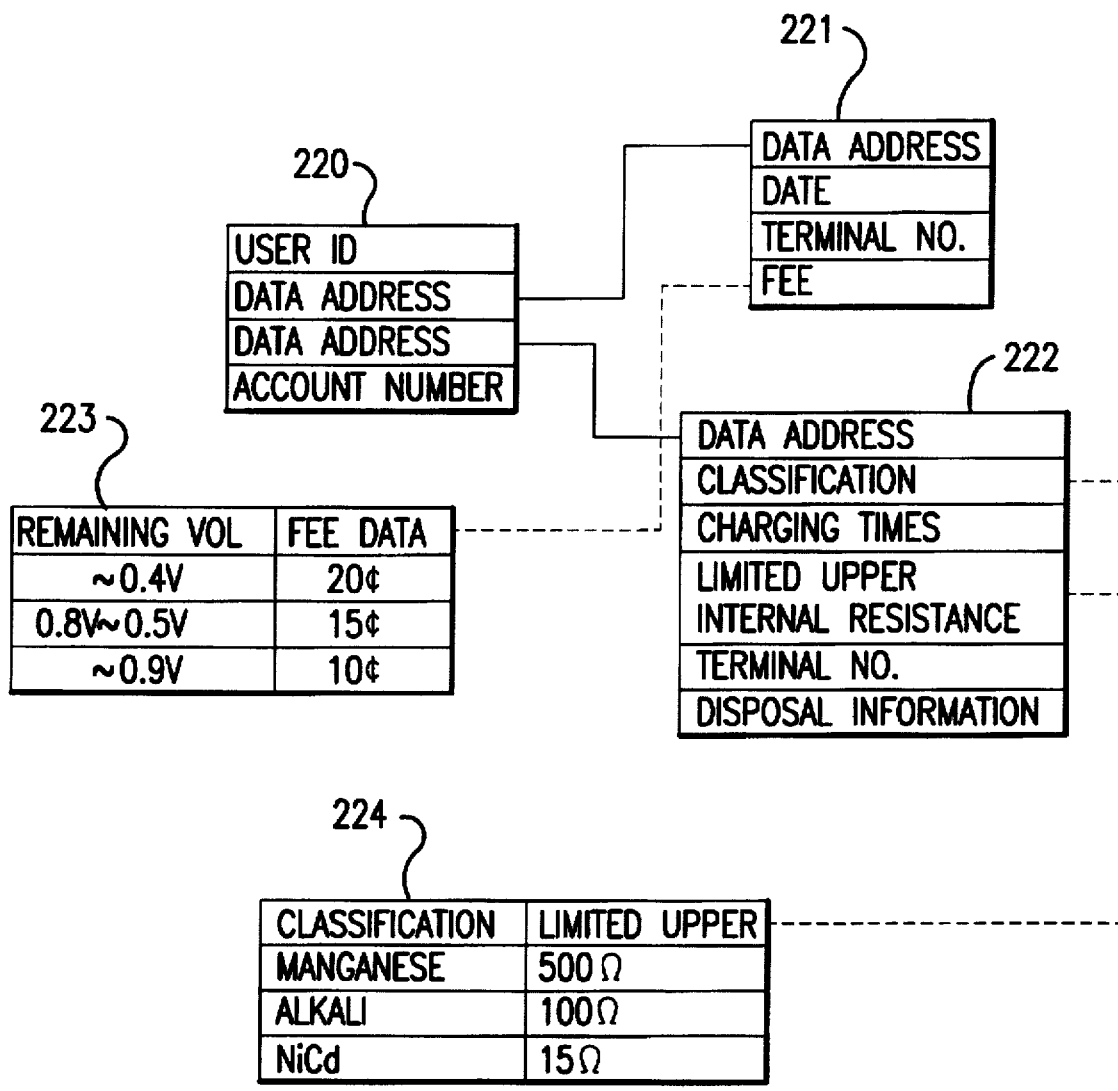
FIG. 14 is a schematic representation of a management table in the network management apparatus of the first embodiment of the present invention.

FIG. 14 shows an example of management tables in the ROM 205 and the NV RAM 209. As shown in FIG. 14, a user table 220 stores a user ID (number) and a data address of a user information table 221, a data address of a battery ID table 222, and a user's account number (e.g. bank account number). The user information table 221 stores a date of utilization, a terminal number of utilization, and a charge fee. The battery ID table 222 stores a battery classification, charging times, a limited upper internal resistance of a battery, a stacking terminal (apparatus) number, and disposal information for indicating whether a battery is to be disposed or not. As these management tables need to be maintained even if the power supply turns off, the management table are stored in the NV RAM 209.

The charge fee table 223 stores several fee data corresponding to remaining electric power. The battery table 224 stores some data of the upper limited internal resistance corresponding to every battery which the battery charging apparatus can recharge. Data of the charge fee table 223 and the battery table 224 are also fixed data, so these tables are stored in the ROM 205.

Figure 15:
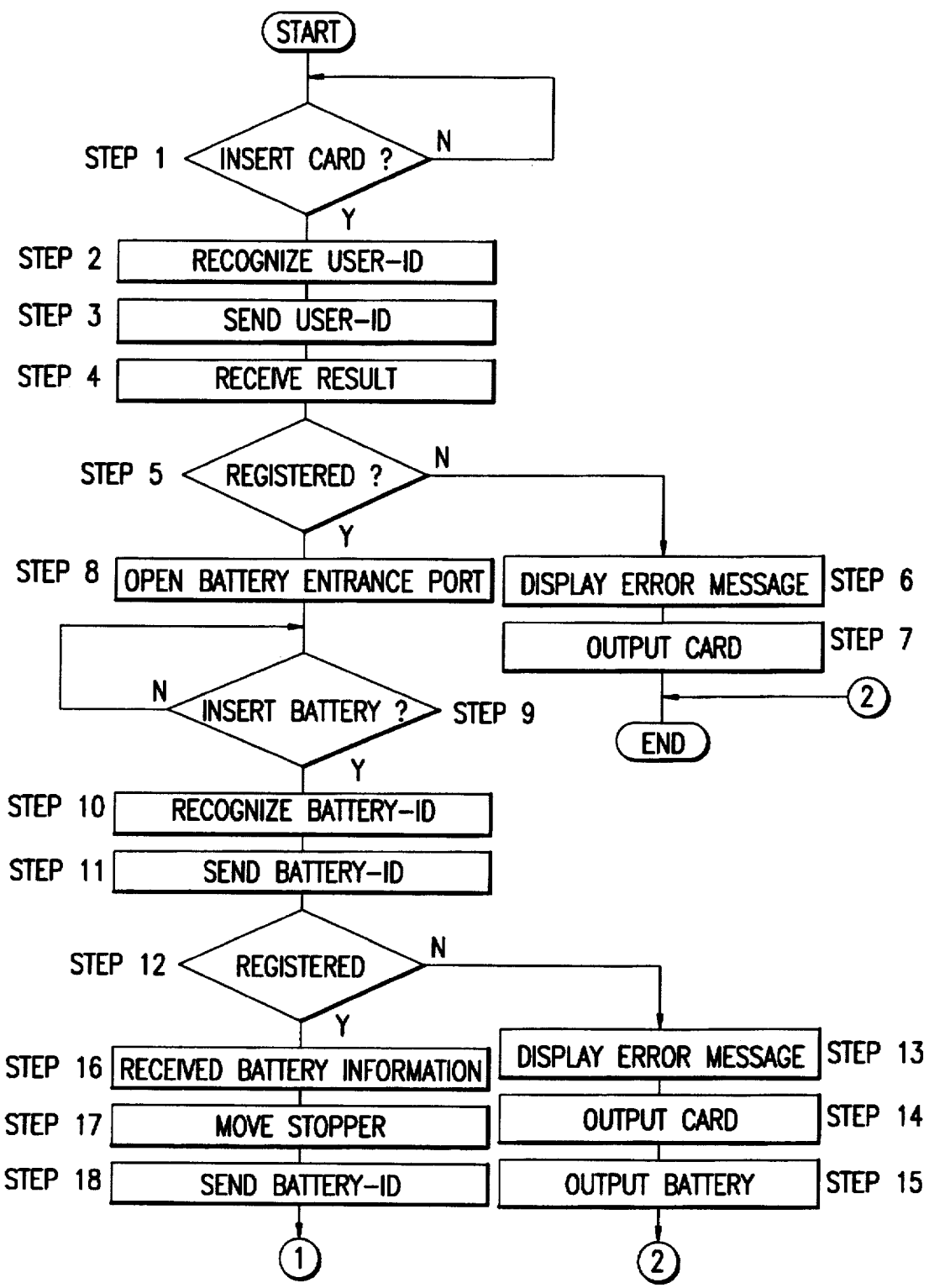
FIG. 15 and FIG. 16 are flowcharts illustrating a process for charging a battery in the first embodiment of the present invention.
Figure 16:
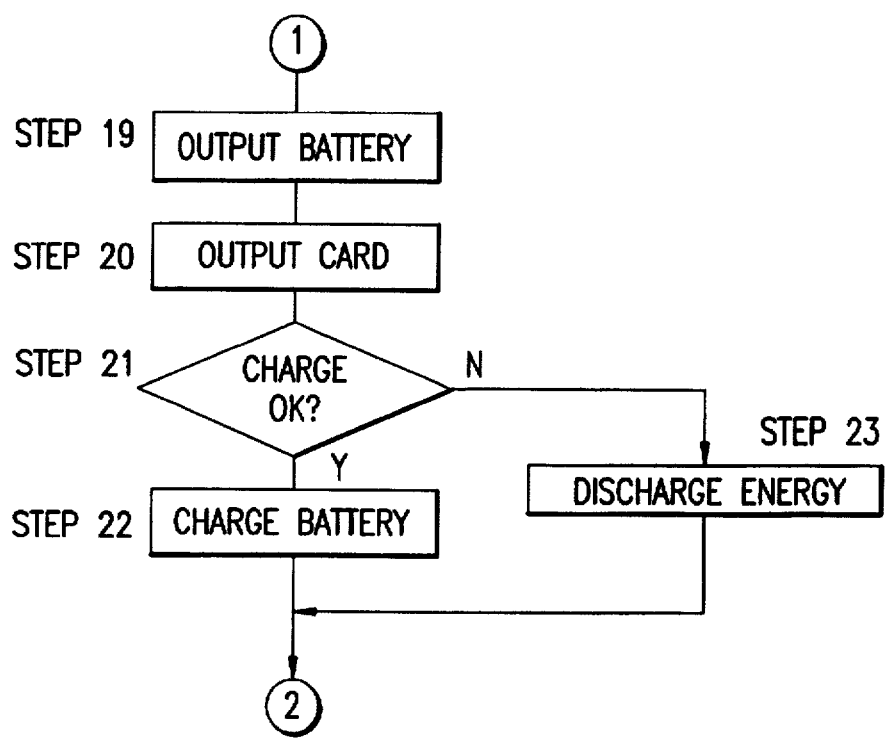

FIG. 15 and FIG. 16 are flowcharts illustrating a charging operation at the battery charging apparatus 1.

Referring to FIG. 15, when a user inserts a card 5 in step 1, the controller 20 recognizes a user ID by the card reading unit 26 in step 2 and sends the user ID to the network management apparatus 2 through the network communication line in step 3. Then the controller 20 receives a result of a judgment from the network management apparatus 2 (i.e. whether the inserted card 5 is registered or not) in steps 4 and 5. If the inserted card 5 is registered, this indicates that the user is authorized to use the battery charging apparatus 1. The controller 20 displays an error message by the display unit 16 and controls outputting the inserted card in steps 6 and 7 if the result of the judgment indicates that the inserted card is not registered. This indicates that the user is not authorized to use the battery charging apparatus 1. On the other hand, the controller 20 controls moving the shutter drive unit 29 for opening the battery entrance port 12 in step 8 if the result of the judgment indicates that the inserted card is registered, i.e. that the user is authorized to use the battery charging apparatus 1.

Then, when the controller 20 detects insertion of the battery in step 9, the controller 20 recognizes a battery ID of the inserted battery 4 by the battery reading unit 28 reading bar code 4c of the inserted battery 4, and sends the battery ID to the network management apparatus 2 in steps 10 and 11. And then the controller 20 receives a result of a judgment from the network management apparatus 2 (i.e. whether the battery is registered or not) in step 12. If the battery type is registered, this indicates that the battery can be processed by the battery charging apparatus 1. The controller 20 displays an error message by the display unit 16 and controls outputting the inserted card and moving the stoppers 281, 341 and driving the door 41 for outputting the inserted battery in steps 13, 14, 15 if the result of the judgment indicates that the inserted battery 4 is not registered. This indicates that the battery charging apparatus 1 cannot process the type of battery inserted. On the other hand, the controller 20 receives battery information (e.g. battery classification, charging time, a limited upper internal resistance of the battery, etc.) in step 16 and stores the battery information in the RAM 23 if the result of the judgment in step 12 indicates that the inserted battery 4 is registered, i.e. that the battery charging apparatus 1 can process the type of battery inserted.

The controller 20 controls the solenoid drive unit 33 for moving an appropriate one of the stoppers 52 based on the received battery information (battery classification) so that a charged battery which is of the same classification as the inserted battery is output in step 17. That is, the user immediately receives a charged battery stored in the battery storage section 51 of the same type as the battery inserted. Thus, the user does not need to wait while the inserted battery 4 is being charged. The inserted battery 4 may then be charged and provided to a subsequent user. The controller 20 then recognizes the charged battery ID by the outputting battery reading unit 34 and sends the battery ID to the network management apparatus 2 in step 18. Then, the controller 20 controls the solenoid drive unit 33 for moving the stopper 341 to output the charged battery, and to output the inserted card in steps 19 and 20.

The controller 20 then judges whether the inserted battery can still be charged or not, i.e. whether its useful life is overlife is over, based on received battery information from the network management apparatus 2 (e.g., a number of times that the inserted battery has already been charged) in step 21. That is, the network management apparatus 2 can record the number of times that a battery with a specific ID has been charged. Typically, rechargeable batteries can be charged a certain number of times before their useful life is over. After the network management apparatus 2 receives the battery ID from the charging apparatus 1, the network management apparatus 2 can evaluate whether the specific inserted battery has been charged a certain number of times which would indicate that the specific inserted battery's useful life is over. When the result of the judgment is that the inserted battery 4 can still be charged, the controller 20 controls the solenoid drive unit 33 for moving the stopper 281, and controls the door drive unit 30 for opening one of the doors 41, 42, 43 based on the read battery information (battery classification) so that the inserted battery 4 can then be charged in step 22.

On other hand, if the result of the judgment is that the inserted battery 4 cannot be charged, i.e. that the useful life of the inserted battery 4 is over, the controller 20 controls the solenoid drive unit 33 to move the stopper 281 and to maintain all of the doors 41, 42, 43 closed, so that then the inserted battery 4 falls into the battery collection guide 57. The inserted battery 4 is then discharged by the energy discharging unit 35 in step 23. The inserted battery 4 has its power discharged to make use of any residual energy in the battery and for safety reasons since allowing the residual charge to be maintained in the battery may result in energy leakage, which could possibly cause damage, sparks, a fire, etc., in the battery charging apparatus 1.

Figure 17:
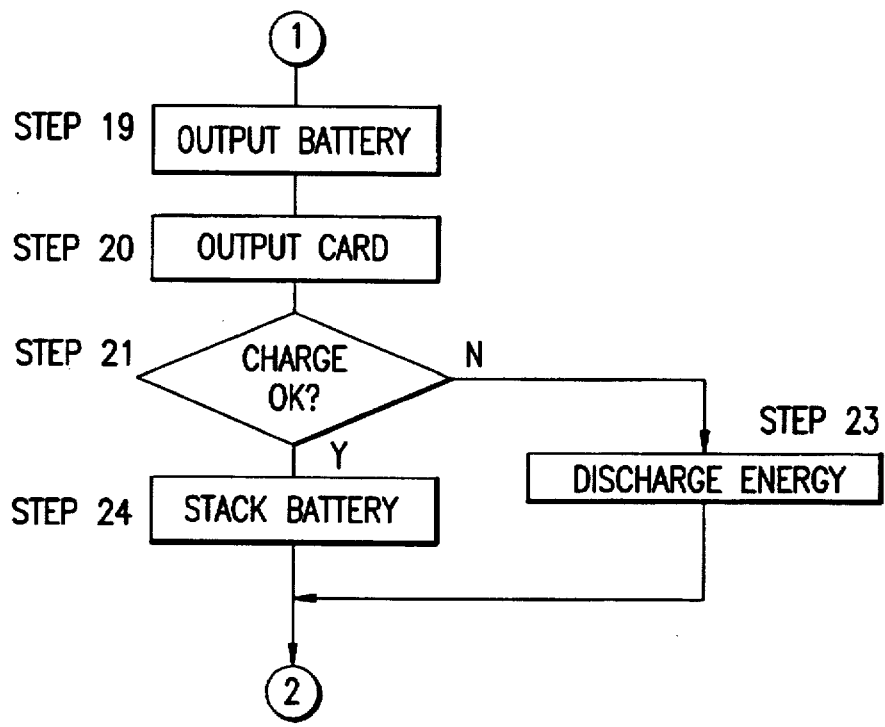
FIG. 17, FIG. 18 and FIG. 19 are flowcharts illustrating an arrangement of the process for charging battery in the first embodiment of the present invention.
Figure 18:
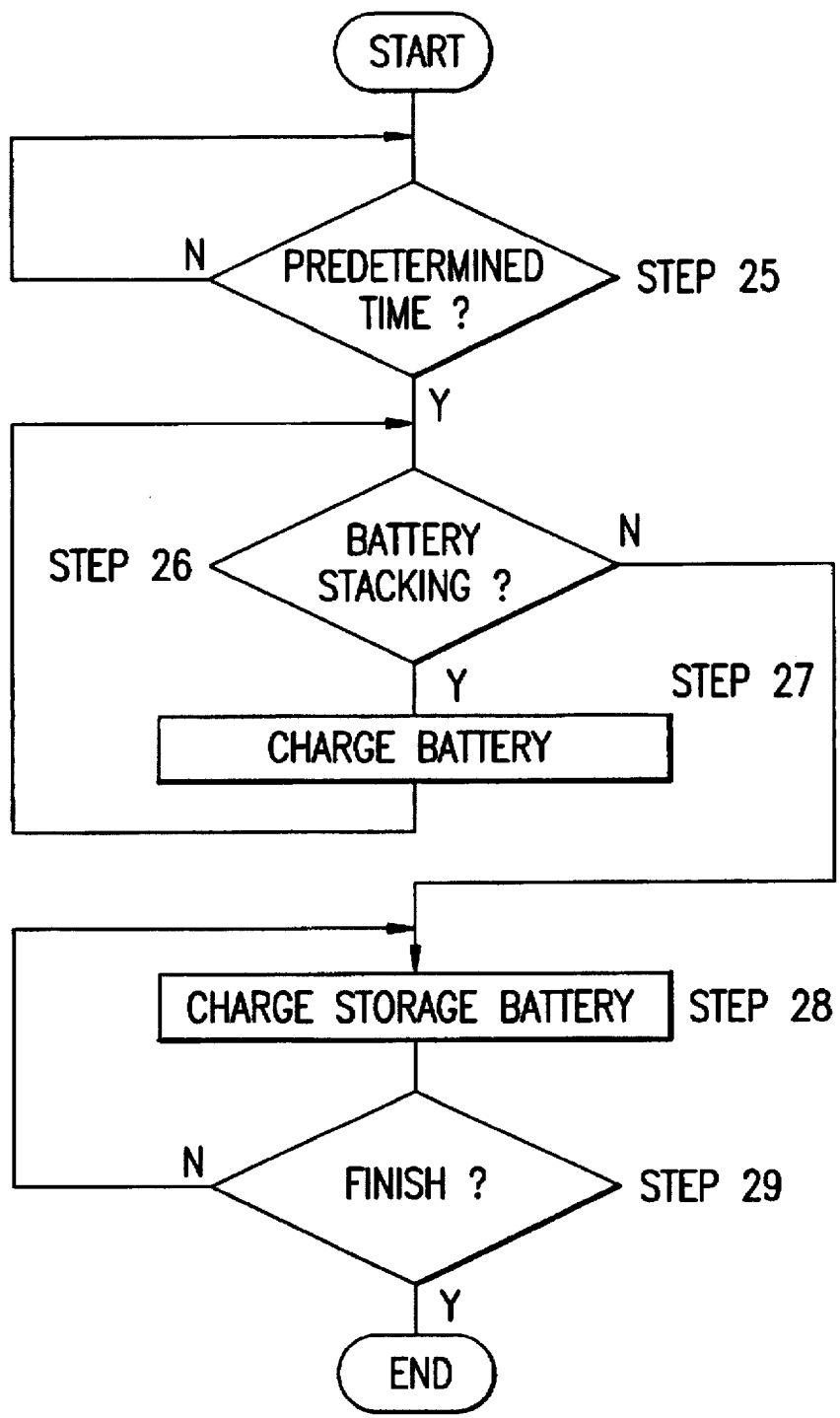

FIGS. 17 and 18 show a modification of the operation of the present invention which reduces a charging fee. In this case, if the result of the judgment is that the inserted battery 4 can be charged, the controller 20 does not charge the inserted battery 4 at once, but only stacks the inserted battery 4 on one of the battery guides 48A, 48B, 48C in step 24. And then, when a time of the timer 32 becomes a predetermined time (for example, a time when cheap power is available) in step 25, the controller 20 operates to then charge the stacked batteries and the storage battery 86, if any batteries are stacked in the battery guides 48, see steps 26, 27, 28 and 29.

Figure 19:
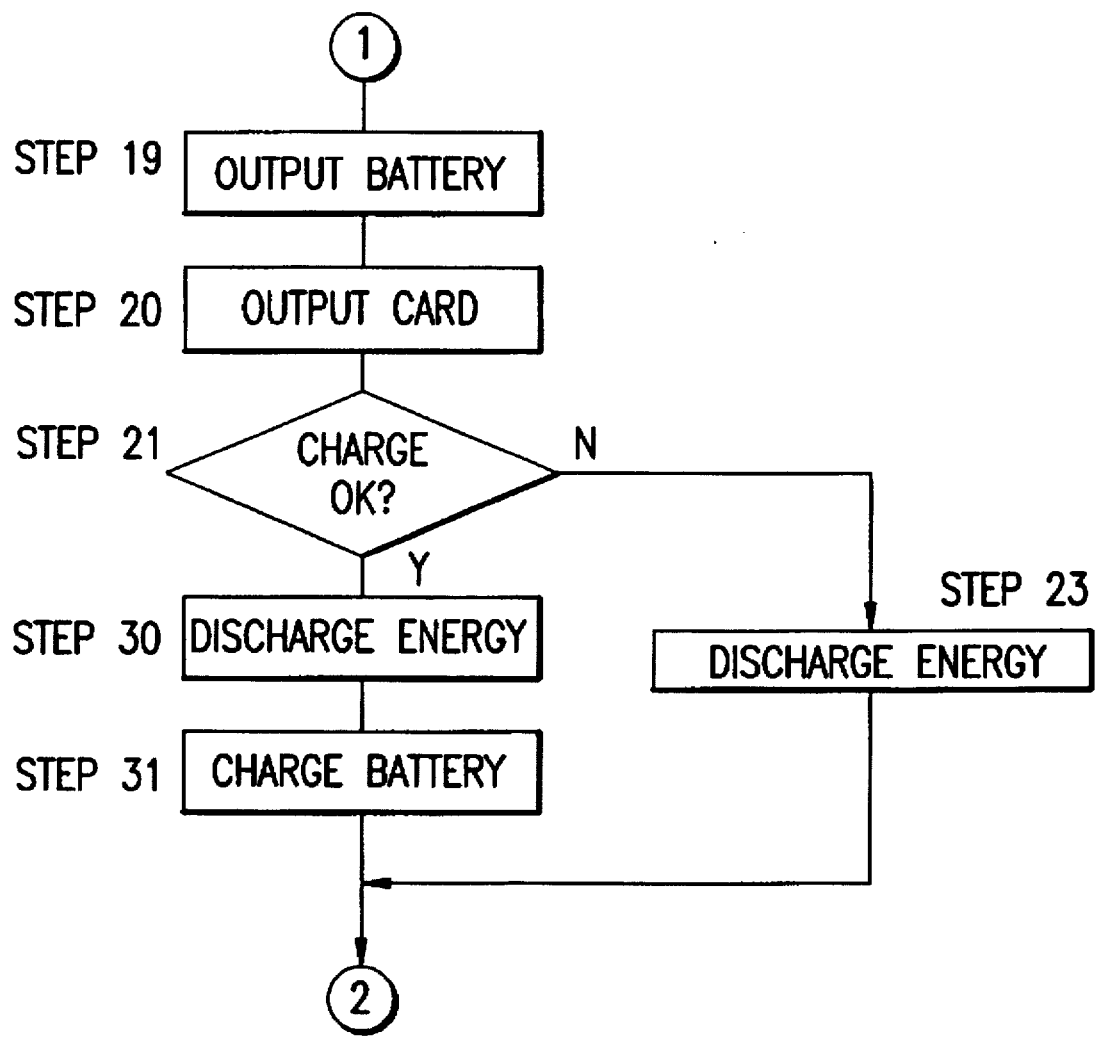

And also, FIG. 19 is a modification of the operation of the present invention which raises a battery charging efficiency. In this composition, if the result of the judgment is that the inserted battery 4 can be charged, the controller 20 discharges the inserted battery first, and then charges the discharged battery, to thereby raise a battery charging efficiency in steps 30 and 31.

Figure 20:
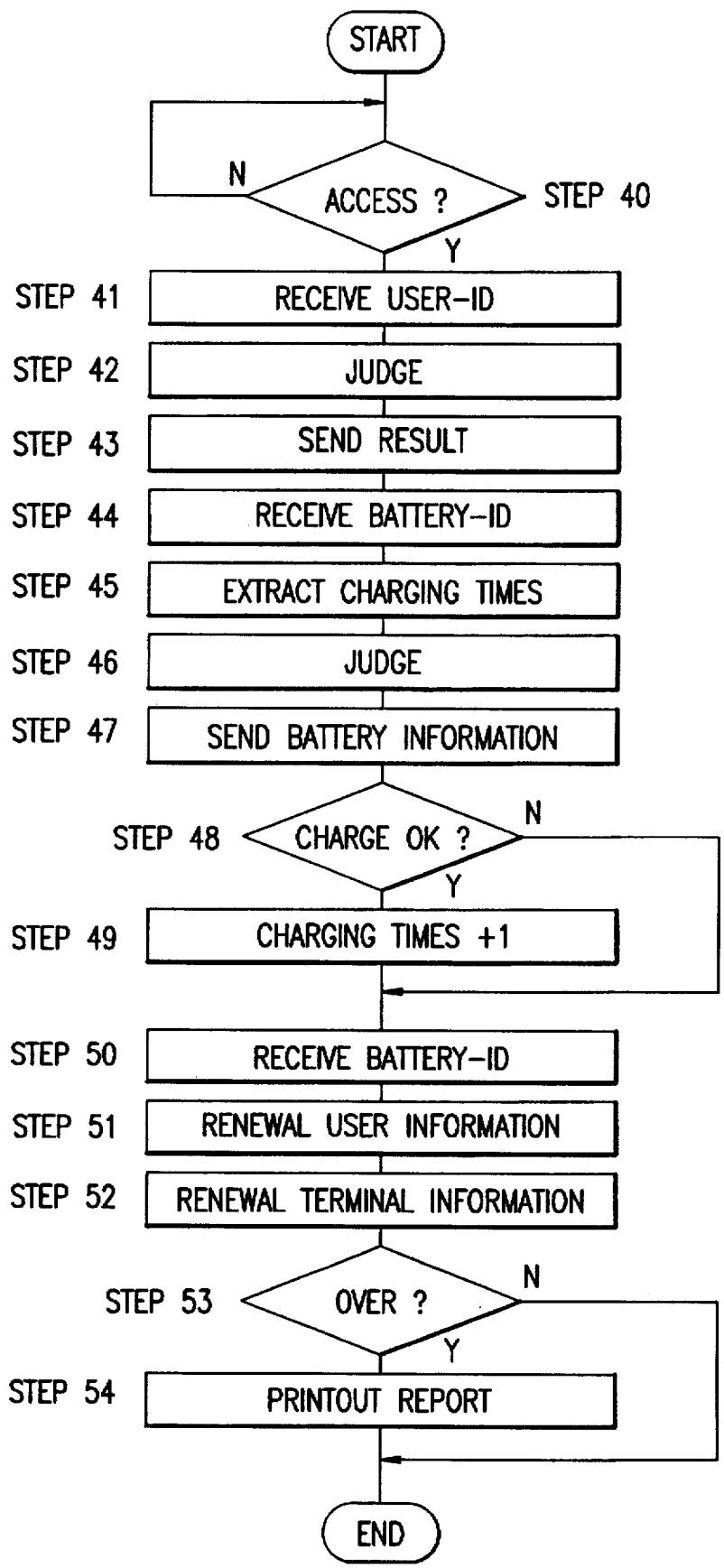
FIG. 20 is a flowchart illustrating a network management operation of the first embodiment of the present invention.

FIG. 20 is a flow chart illustrating an operation at the network management apparatus 2.

When the CPU 204 detects an access from the battery charging apparatus 1 in step 40, the network communication unit 208 receives a user ID and the CPU 204 judges whether the user ID is registered or not based on the data (user ID table 220) in the RAM 209, and sends the result of the judgment to the battery charging apparatus 1 in steps 42 and 43. When the user ID is registered, the network communication unit 208 receives a battery ID and the CPU 204 judges whether the battery ID is registered or not based on the data battery ID (table 222), and extracts a charging time based on the battery ID and judges whether the inserted battery 4 can be recharged or not based on the number of times that the inserted battery 4 has been charged, in steps 45 and 46. When the result of judgment is that the inserted battery 4 is registered and can be recharged, the CPU 204 sends such a result to the battery charging apparatus 1 and adds "1" as the number of times that the inserted battery 4 has been charged in the battery ID table 222 in steps 47, 48, 49.

Then the network communication unit 208 receives a battery ID (on output of a charged battery) and the CPU 204 changes the battery ID of the user ID table 220 and renews the use information table 221 and the battery ID table 222 in steps 50, 51 and 52. Further, if the network management apparatus 2 also manages the number of batteries stacked in the disposal stack 61, the CPU 204 may recognize if the number is over a stacking limit or not in step 53, and when the number is over the stacking limit, the CPU 204 may control to print out a request report for battery collection to some staff in steps 53 and 54. Also, in accordance with step 42, the CPU 204 may also judge a life span of the battery based on a measured internal resistance of the inserted battery 4, instead of being based on a number of times the inserted battery 4 has been charged.

This first embodiment of the present invention shows control operations performed by the network management apparatus 2; however, the controls performed by the network management apparatus 2 can be performed in controller 20 of each individual battery charging apparatus 1, and network management apparatus 2 can be eliminated.

Next, a second construction of a battery charge apparatus and network system in accordance with the present invention will be explained.

Figure 21:
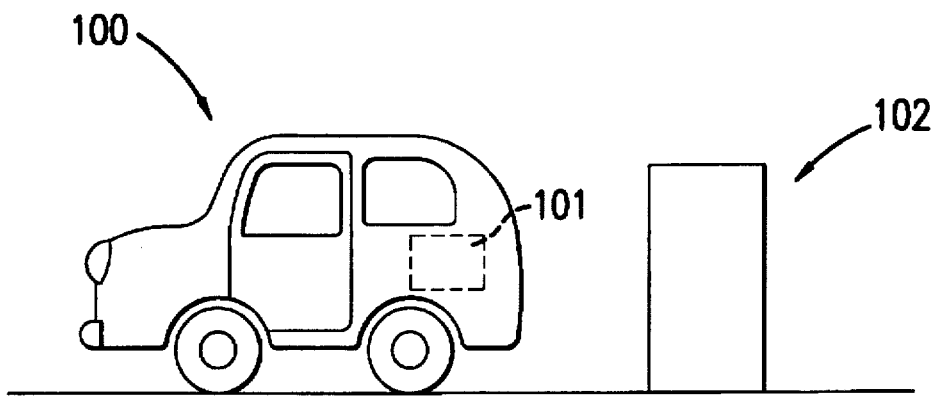
FIG. 21 shows a battery charging operation in a second embodiment of the present invention.

Referring to FIG. 21, an electric automobile 100 carries a battery 101 for supplying power to an engine motor (not shown) in a trunk and a battery charging apparatus 102 is established in a place, such as a parking lot, a gas station, and the like.

Figure 22:
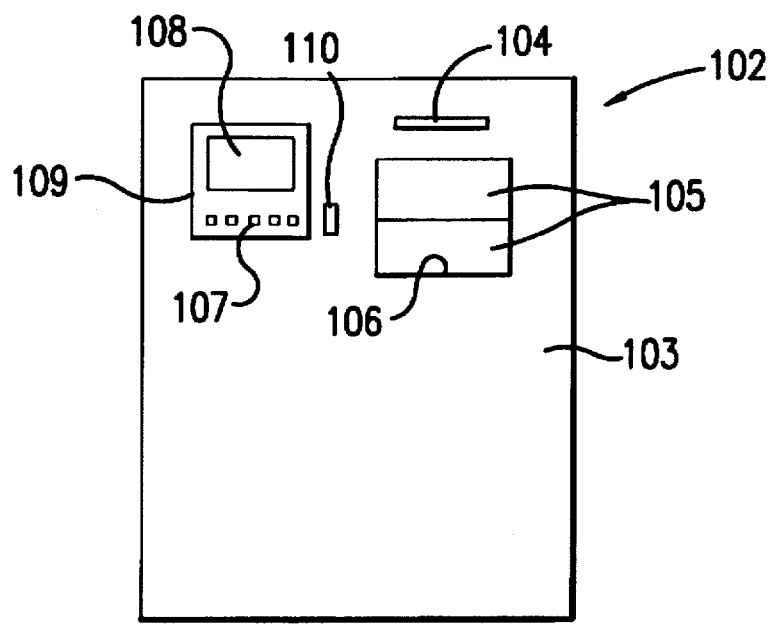
FIG. 22 is front view illustrating a battery charging apparatus in the second embodiment of the present invention.
Figure 23:
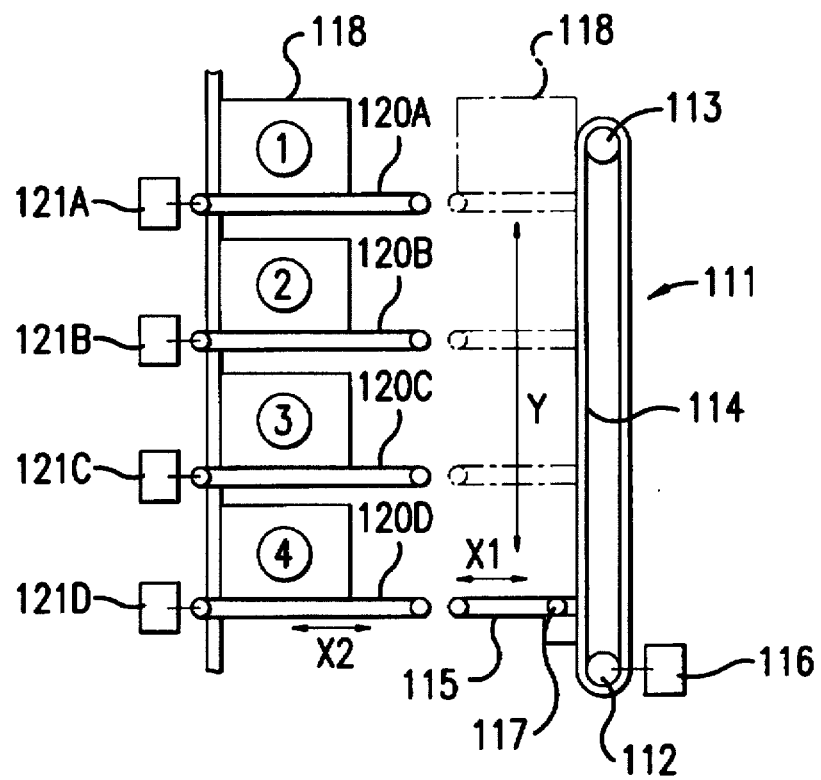
FIG. 23 and FIG. 24 are schematic sectional views of the battery charging apparatus of the second embodiment of the present invention.
Figure 24:
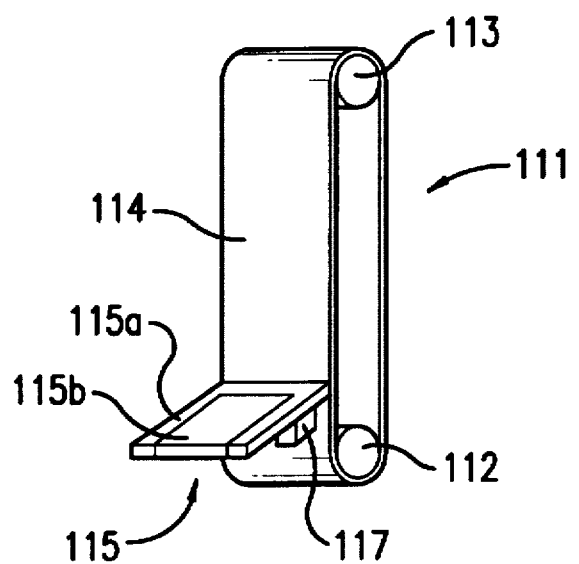

Referring to FIG. 22, a main body 103 of the battery charging apparatus 102 includes a card entrance port 104, a shutter 105, a battery entrance port 106, an operation board 107, a display unit 108, and a money insertion port 110. Inside of the main body 103, the battery charging apparatus includes, as shown in FIGS. 23 and 24, a conveyer 111, a pair of rollers 112, 113, a conveyer belt 114, a box conveyer 115 which contains a body 115a and conveyer belt 115b, a motor 116 for rotating the roller 112, a motor 117 for moving the conveyer belt 115b, four battery boxes 118, four conveyer belts 120A, 120B, 120C, 120D for conveying the battery boxes 118, and four motors 121A, 121B, 121C, 121D for moving the conveyer belt 120.

Referring to FIG. 25, the battery 101 includes electrode terminals 101a, 101b, and a record medium 101c for recording a battery information (registration number, classification, charging number).

Referring to FIG. 26, a front of the battery boxes 118 is opened for getting the battery 101 in and out, and includes a pair of electrode pins 118a, 118b and a reading sensor 118c for reading a battery information on the record medium 101c. The pair of electrode pins are connected to a circuit, such as the battery charging unit 31 of FIG. 10, and/or the battery discharging unit 25 of FIG. 11, so that a battery set in each battery box 118 can be discharged and/or charged.

FIG. 27 shows a management table in order to manage the state of the four battery boxes, and the management table is stored in a memory. In a case of this management table, "charging" means which battery is currently being charged, "finish charge" means a battery charged already, "vacant" means which the battery box is vacant (no battery). It is noted that at least one vacant battery box is needed to take in a used battery.

For example, in a case of the state of the management table as shown in FIG. 27, when a user requests to exchange a battery, a battery box ④ of which state is "vacant" is selected and is moved by the conveyers 120D, 115a, 111 as shown in FIGS. 28(a) and 28(b). After the user gets the used battery into the battery box ④, the battery box is moved to a basic position as shown in FIG. 29(a), and then the used battery is charged if possible. Also, the battery charging apparatus selects one battery box of which state is "finish charge", such as battery boxes ②, ③ and moves a selected battery as shown in FIGS. 29(a) and 29(b). After the battery in the selected battery box is removed by the user, the battery charging apparatus 102 moves the selected battery box to a basic position. Also, the management table is renewed, in this case, the state of the battery box ③ is changed to "vacant" and the state of the battery box ④ is changed to "charging now".

Figure 30:
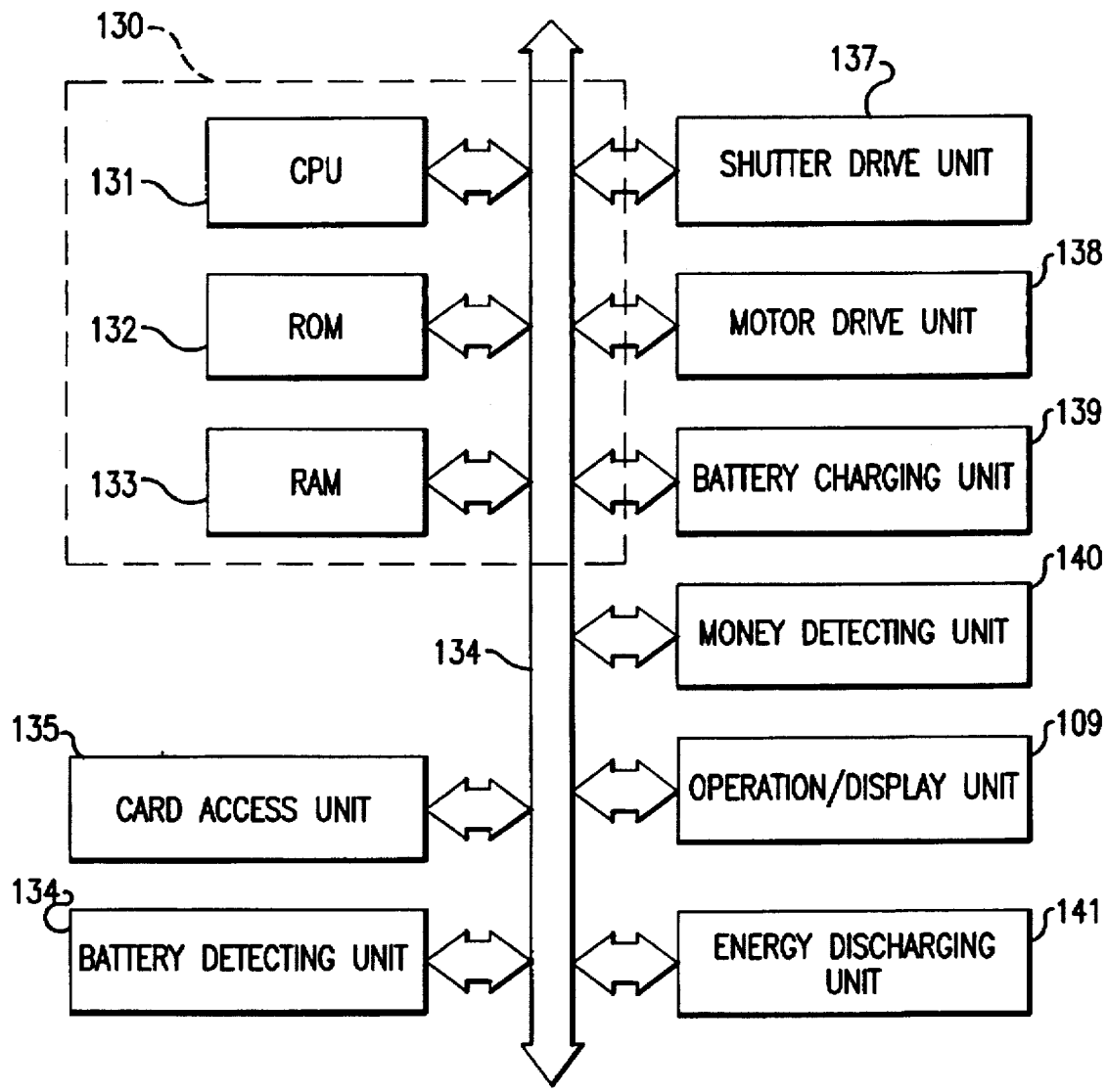
FIG. 30 is a schematic block diagram of a battery charging unit of the second embodiment of the present invention.

Referring to FIG. 30, the micro-computer 130 of the battery charging apparatus 102 includes a CPU 131, ROM 132 and RAM 133. And also the battery charging apparatus 102 includes a card access unit 135 for reading and writing a card information of an inserted card, a prepaid card, a smart value card, etc. and a battery detecting unit 136 for detecting insertion of a battery, a battery classification and charging number, a shutter drive unit 137 for driving the shutter 105, a motor drive unit 138 for driving the motors 116, 117, 121A, 121B, 121C and 121D, a battery charging unit 139, such as shown in FIG. 10, a money detecting unit 140 for checking an inserted money, an operation/display unit 109, and an energy discharging unit 141, such as shown in FIG. 11, and all of which are coupled to each other by system bus 134.

Figure 31:
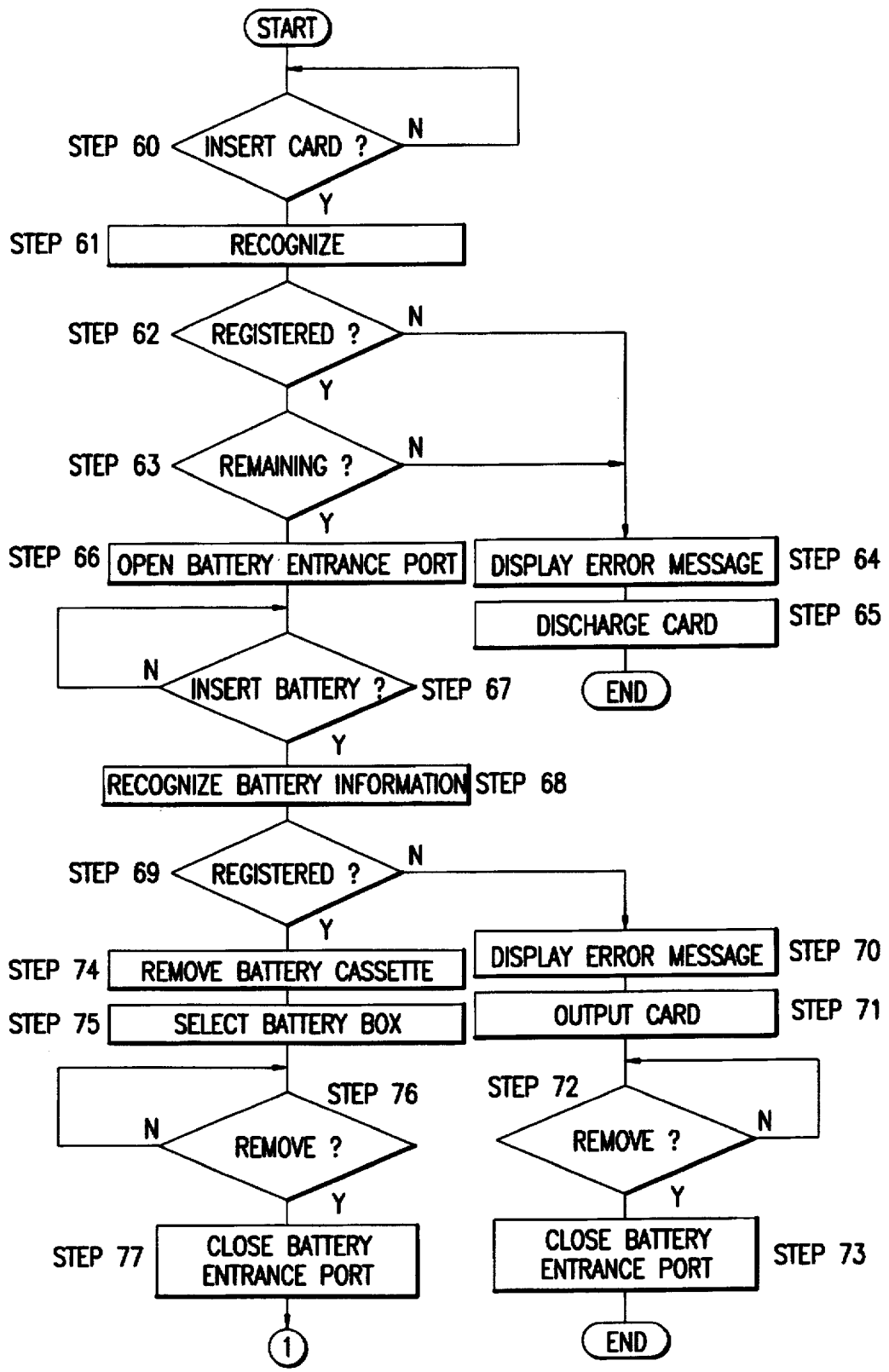
FIG. 31 and FIG. 32 are flowcharts illustrating a process for charging a battery in the second embodiment of the present invention.
Figure 32:
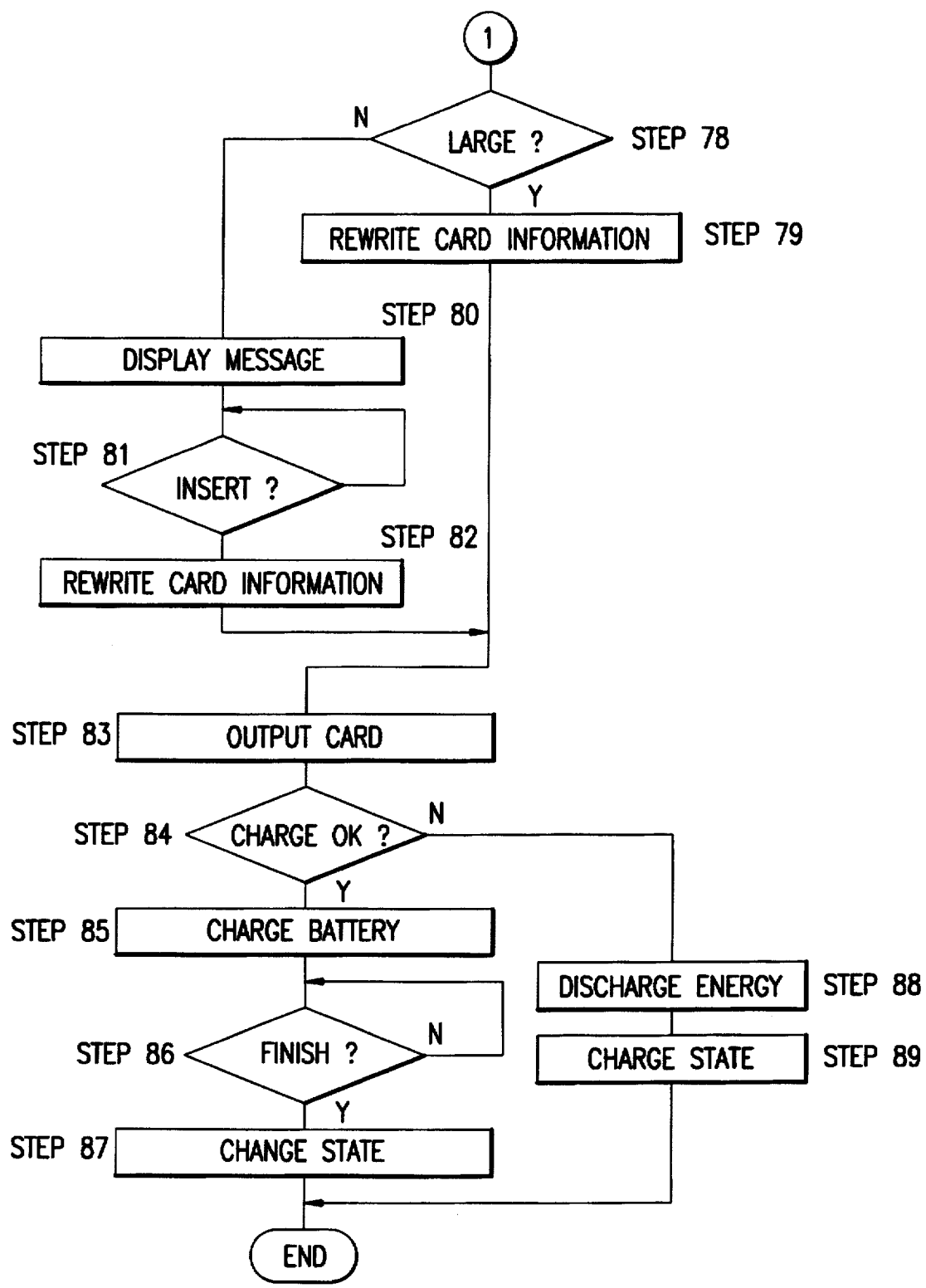

FIG. 31 and FIG. 32 are flowcharts illustrating a charging operation at the battery charging apparatus 102 of this second embodiment of the present invention.

Referring to FIG. 31, when a user inserts a card 5, see step 60, from the card entrance 104, the card access unit 135 reads the card information from the inserted card and the CPU 131 recognizes the user ID and a balance (money left) based on the card information in step 61. Then, the CPU 131 judges whether the inserted card 5 is registered or not in step 62, and whether a balance remains on the card 5 in step 63.

When the CPU 131 judges that the inserted card 5 is not registered, or that no balance remains on the inserted card 5, the CPU 131 controls to display error messages on the operation/display unit 109 and to output the inserted card 5 in steps 64 and 65.

On the other hand, when the CPU 131 judges that the inserted card 5 is registered and that a balance does remain on the inserted card 5, the shutter drive unit 137 drives the shutter 105 and the CPU 131 selects a battery box of which state is "vacant", and moves the selected battery box toward the battery entrance port 106 in step 66. Then the CPU 131 recognizes that a user places the used battery 101 into the moved battery box based on the signal from the battery detect unit 136 in step 67, and the CPU 131 then recognizes a battery information by the battery detecting unit 136 and judges whether the inserted battery 101 is registered or not based on the battery information, see steps 68 and 69.

When the CPU 131 judges that the inserted battery 101 is not registered, the CPU 131 controls to display error messages on the operation/display unit 109 and to output the inserted card 5, and the shutter drive unit 137 closes the shutter 105 after the user removes the inserted battery 101 in steps 70, 71, 72 and 73.

On the other hand, when the CPU 131 judges that the inserted battery 101 is registered, the CPU 131 moves the battery case from the basic position in step 74, and selects a battery box of which state is "finish charge", and moves the selected battery box toward the battery entrance 106 for supplying a charged battery to the user in step 75. And then, the shutter drive unit 137 closes the shutter 105 after the user removes the charged battery in steps 76 and 77. Then, the CPU 131 compares a balance and charge fee, and when the balance is larger than the charge fee or the balance and charge fee are equal, the CPU 131 controls to rewrite the card information for subtracting the charge fee therefrom in steps 78 and 79. On the other hand, when the balance is smaller than the charge fee, the CPU 131 controls to display a message on the operation/display unit 109 for the user to pay the difference in step 80. Then, when the CPU 131 recognizes that the difference is inserted, the CPU 131 then rewrites the card information and outputs the card in steps 81, 82 and 83.

The CPU 131 then judges whether the used battery is able to be charged or not in step 84 based on information, such as a battery classification, a battery internal resistance, and the like. When the CPU 131 judges that the used battery can be charged, the CPU 131 controls the battery charging unit 139 for charging the used battery, and changes the state of the management table as "charging now" and the "charging times" recorded on the record medium 101c are rewritten by (+1) in step 85. After finishing the battery charging, the CPU 131 changes the state of the management table to "finish charge" in steps 86 and 87.

On other hand, when the CPU 131 judges that the used battery cannot be charged, the CPU 131 controls the outputting unit 141 to output the battery, and changes the state of the management table as "NG" in steps 88 and 89.

In the embodiments of the present invention discussed above, the first embodiment is shown connected to a network. However, each battery charging apparatus 1 can be a self-contained unit, and need not be connected in such a network. Further, the second embodiment is shown as a self-contained unit. However, this system of the second embodiment can clearly also be formed in a network, similarly as discussed with respect to the first embodiment. Also, each of the features of the first embodiment can be applied to the second embodiment, and similarly the features of the second embodiment can be applied to the first embodiment.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A battery charging apparatus comprising:
    a detecting means for detecting insertion of a battery;
    a reading means for reading first information on the inserted battery;
    a charging means for charging the inserted battery;
    an outputting means for outputting a charged battery which is different than the in inserted battery; and
    a control means for controlling the charging means and outputting means based on the read first information.

2. A battery charging apparatus, comprising:
    a detecting means for detecting insertion of a battery;
    a reading means for reading first information on the inserted battery;
    a charging means for charging the charged battery;
    an outputting means for outputting a charged battery;
    a card detecting means for detecting insertion of a card;
    a card reading means for reading second information on an inserted card; and
    a control means for controlling the charging means and outputting means based on the read first information and for controlling the outputting means further based on the read second information.

3. The battery charging apparatus according to claim 1, further comprising:
    a display means; and
    wherein the read first information is a battery identification, and the control means controls the display means to display an error message if the read first information indicates a battery identification not registered in the control means.

4. A battery charging apparatus, comprising:
    a detecting means for detecting insertion of a battery;
    a reading means for reading first information on the inserted battery;
    a charging means for charging the inserted battery;
    an outputting means for outputting a charged battery:
    a display means; and
    a control means for controlling the charging means and outputting means based on the read first information;
    wherein a read second information is a card identification, and the control means further controls the display means to display an error message if the read second information indicates a card identification not registered in the control means.

5. The battery charging apparatus according to claim 1, wherein the control means further judges whether the inserted battery is able to be charged or not.

6. The battery charging apparatus according to claim 2, further comprising:
    a shutter means for opening/closing a battery entrance port through which the inserted battery is inserted; and
    wherein the read second information is a card identification, and the control means controls the shutter means to open if the read second information indicates a card identification registered in the control means.

7. The battery charging apparatus according to claim 1:
    wherein the outputting means can further output the inserted battery; and
    wherein the read first information is a battery identification, and the control means controls the outputting means to output the inserted battery if the read first information indicates a battery identification not registered in the control means.

8. The battery charging apparatus according to claim 5, further comprising:
    energy discharging means for discharging an energy of the inserted battery.

9. The battery charging apparatus, comprising:
    a detecting means for detecting insertion of a battery;
    a reading means for reading first information on the inserted battery;
    a charging means for charging the inserted battery;
    an outputting means for outputting a charged battery;
    a control means for controlling the charging means and outputting means based on the read first information; and
    stack means for stacking the inserted battery when the control means judges that the inserted battery cannot be charged.

10. The battery charging apparatus according to claim 5, wherein said control means controls the charging means to charge the inserted battery at a predetermined time when the control means judges that the inserted battery can be charged.

11. A networked controlled battery charging system, comprising:
    a host computer means;
    at least one battery charging means communicating with the host computer means through a communication line means, each at least one battery charging means comprising:
        a detecting means for detecting insertion of a battery;
        a reading means for reading first information on the inserted battery;
        a charging means for charging the inserted battery;
        an outputting means for outputting a charged battery which is different than the inserted battery; and
        a transmitting means for transmitting the read first information to the host computer means through the communication line means;

wherein the host computer means controls said charging means and outputting means based on the transmitted read first information.

12. A network controlled battery charging system, comprising:
a host computer means;
at least one battery charging means communicating with the host computer means through a communication line means each at least one battery charging means comprising:
a detecting means for detecting insertion of a battery;
a reading means for reading first information on the inserted battery;
a charging means for charging the inserted battery;
an outputting means for outputting a charged battery;
a card detecting means for detecting insertion of a card;
a card reading means for reading second information on an inserted card; and
a transmitting means for transmitting the read first information to the host computer means through the communication line means;
wherein the host computer means controls said charging means and outputting means based on the transmitted read first information; and
wherein the host computer means controls the outputting means further based on the read second information.

13. The network controlled battery charging system according to claim 12, wherein each at least one battery charging means further comprises:
a display means; and
wherein the read first information is a battery identification, and the host computer means controls the display means to display an error message if the read first information indicates a battery identification not registered in the host computer means.

14. A network controlled battery charging system, comprising:
a host computer means;
at least one battery charging means communicating with the host computer means through a communication line means each at least one battery charging means comprising:
a detecting means for detecting insertion of a battery;
a reading means for reading first information on the inserted battery;
a charging means for charging the inserted battery;
an outputting means for outputting a charged battery; and
a transmitting means for transmitting the read first information to the host computer means through the communication line means;
a display means;
wherein the host computer means controls said charging means and outputting means based on the transmitted read first information; and
wherein a read second information is a card identification, and the host computer means further controls the display means to display an error message if the read second information indicates a card identification not registered in the host computer means.

15. The network controlled battery charging system according to claim 11, wherein the host computer means judges whether the inserted battery is able to be charged or not.

16. The network controlled battery charging system according to claim 12, wherein each at least one battery charging means further comprises:

a shutter means for opening/closing a battery entrance port through which the inserted battery is inserted; and
wherein the read second information is a card identification, and the host computer means controls the shutter means to open if the read second information indicates a card identification registered in the host computer means.

17. The network controlled battery charging system according to claim 11:
wherein the outputting means can further output the inserted battery; and
wherein the read first information is a battery identification, and the host computer means controls the outputting means to output the inserted battery if the read first information indicates a battery identification not registered in the host computer means.

18. The network controlled battery charging system according to claim 15, wherein each at least one battery charging means further comprises:
energy discharging means for discharging an energy of the inserted battery.

19. A network controlled battery charging system, comprising:
a host computer means;
at least one battery charging means communicating with the host computer means through a communication line means, each at least one battery charging means comprising:
a detecting means for detecting insertion of a battery;
a reading means for reading first information on the inserted battery;
a charging means for charging the inserted battery;
an outputting means for outputting a charged battery;
a transmitting means for transmitting the read first information to the host computer means through the communication line means; and
stack means for stacking the inserted battery when the host computer means judges that the inserted battery cannot be recharged;
wherein the host computer means controls said charging means and outputting means based on the transmitted read first information.

20. The network controlled battery charging system according to claim 15, wherein said host computer means controls the charging means to charge the inserted battery at a predetermined time.

21. A battery charging apparatus comprising:
a detector detecting insertion of a battery;
a reader reading first information on the inserted battery;
a charger charging the inserted battery;
an output unit outputting a charged battery which is different than the inserted battery; and
a controller controlling the charger and output unit based on the read first information.

22. A battery charging apparatus, comprising:
a detector detecting insertion of a battery;
a reader reading first information on the inserted battery;
a charger charging the inserted battery;
an output unit outputting a charged battery; and
a card detector detecting insertion of a card;
a card reader reading second information on an inserted card; and
a controller for controlling the charger and output unit based on the read first information and for controlling the output unit further based on the read second information.

23. The battery charging apparatus according to claim 22, further comprising:

a display; and wherein the read first information is a battery identification, and the controller controls the display to display an error message if the read first information indicates a battery identification not registered in the control means.

24. A battery charging apparatus, comprising:

a detector detecting insertion of a battery;

a reader reading first information on the inserted battery;

a charger charging the inserted battery;

an output unit outputting a charged battery;

a display; and a controller controlling the charger and output unit based on the read first information;

wherein a read second information is a card identification, and the controller further controls the display to display an error message if the read second information indicates a card identification not registered in the controller.

25. The battery charging apparatus according to claim 21, wherein the controller further judges whether the inserted battery is able to be charged or not.

26. The battery charging apparatus according to claim 22, further comprising:

a shutter opening/closing a battery entrance port through which the inserted battery is inserted; and wherein the read second information is a card identification, and the controller controls the shutter to open if the read second information indicates a card identification registered in the controller.

27. The battery charging apparatus according to claim 21:

wherein the output unit can further output the inserted battery; and wherein the read first information is a battery identification, and the controller controls the output unit to output the inserted battery if the read first information indicates a battery identification not registered in the controller.

28. The battery charging apparatus according to claim 25, further comprising:

an energy discharger discharging an energy of the inserted battery.

29. A battery charging apparatus, comprising:

a detector detecting insertion of a battery;

a reader reading first information on the inserted battery;

charger charging the inserted battery;

an output unit outputting a charged battery; and a controller controlling the charger and output unit based on the read first information; and a stack stacking the inserted battery when the controller judges that the inserted battery cannot be charged.

30. The battery charging apparatus according to claim 25, wherein said controller controls the charger to charge the inserted battery at a predetermined time when the controller judges that the inserted battery can be charged.

31. A networked controlled battery charging system, comprising:

a host computer;

at least one battery charger communicating with the host computer through a communication line, each at least one battery charger comprising:

a detector detecting insertion of a battery;

a reader reading first information on the inserted battery;

a charger charging the inserted battery;

an output unit outputting a charged battery which is different than the inserted battery; and a transmitter transmitting the read first information to the host computer through the communication line;

wherein the host computer controls said charger and output unit based on the transmitted read first information.

32. A battery charging system, comprising:

a host computer;

at least one battery charger communicating with the host computer through a communication line, each at least one battery charger comprising:

a detector detecting insertion of a battery;

a reader reading first information on the inserted battery;

a charger charging the inserted battery;

an output unit outputting a charged battery;

a card detector detecting insertion of a card;

a card reader reading second information on an inserted card; and a transmitter transmitting the read first information to the host computer through the communication line;

wherein the host computer controls said charger and output unit based on the transmitted read first information; and wherein the host computer controls the output unit further based on the read second information.

33. The network controlled battery charging system according to claim 32, wherein each at least one battery charger further comprises:

a display; and wherein the read first information is a battery identification, and the host computer controls the display to display an error message if the read first information indicates a battery identification not registered in the host computer.

34. A network controlled battery charging system, comprising:

a host computer;

at least one battery charger communicating with the host computer through a communication line, each at least one battery charger comprising:

a detector detecting insertion of a battery;

a reader reading first information on the inserted battery;

a charger charging the inserted battery;

an output unit outputting a charged battery; and a transmitter transmitting the read first information to the host computer through the communication line;

a display;

wherein the host computer controls said charger and output unit based on the transmitted read first information; and wherein a read second information is a card identification, and the host computer further controls the display to display an error message if the read second information indicates a card identification not registered in the host computer.

35. The network controlled battery charging system according to claim 31, wherein the host computer means judges whether the inserted battery is able to be charged or not.

36. The network controlled battery charging system according to claim 32, wherein each at least one battery charger further comprises:

a shutter opening/closing a battery entrance port through which the inserted battery is inserted; and wherein the read second information is a card identification, and the host computer controls the shutter to open if the read second information indicates a card identification registered in the host computer.

37. The network controlled battery charging system according to claim 31:

wherein the output unit can further output the inserted battery; and wherein the read first information is a battery identification, and the host computer controls the output unit to output the inserted battery if the read first information indicates a battery identification not registered in the host computer.

38. The network controlled battery charging system according to claim 35, wherein each at least one battery charger further comprises:

an energy discharger discharging an energy of the inserted battery.

39. A network controlled battery charging system, comprising:

a host computer;

at least one battery charger communicating with the host computer through a communication line, each at least one battery charger comprising:

a detector detecting insertion of a battery;

a reader reading first information on the inserted battery;

a charger charging the inserted battery;

an output unit outputting a charged battery;

a transmitter transmitting the read first information to the host computer through the communication line; and a stack stacking the inserted battery when the host computer judges that the inserted battery cannot be recharged, wherein the host computer controls said charger and output unit based on the transmitted read first information.

40. The network controlled battery charging system according to claim 39, wherein said host computer controls the charger to charge the inserted battery at a predetermined time.

* * * * *